(12) United States Patent
Yoon et al.

(10) Patent No.: US 11,006,456 B2
(45) Date of Patent: May 11, 2021

(54) METHOD AND APPARATUS FOR TRANSMITTING AND RECEIVING RANDOM ACCESS CHANNEL

(71) Applicant: LG Electronics Inc., Seoul (KR)

(72) Inventors: Sukhyon Yoon, Seoul (KR); Hyunsoo Ko, Seoul (KR); Eunsun Kim, Seoul (KR); Kijun Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/418,174

(22) Filed: May 21, 2019

(65) Prior Publication Data
US 2019/0274172 A1 Sep. 5, 2019

Related U.S. Application Data

(63) Continuation of application No. 16/064,993, filed as application No. PCT/KR2018/005120 on May 3, 2018.
(Continued)

(51) Int. Cl.
*H04W 72/04* (2009.01)
*H04W 74/08* (2009.01)
(Continued)

(52) U.S. Cl.
CPC ....... *H04W 74/0833* (2013.01); *H04L 5/0041* (2013.01); *H04W 72/044* (2013.01);
(Continued)

(58) Field of Classification Search
CPC .......... H04W 74/0833; H04W 74/006; H04W 72/04
See application file for complete search history.

(56) References Cited

U.S. PATENT DOCUMENTS

2014/0362701 A1* 12/2014 Roh ................. H03M 13/2966
370/235
2015/0003375 A1* 1/2015 Liu .................. H04W 74/0833
370/329
(Continued)

FOREIGN PATENT DOCUMENTS

CN 106385709 2/2017
KR 20140130164 11/2014
(Continued)

OTHER PUBLICATIONS

Nokia et al., "NR Physical Random Access Channel," 3GPP TSG-RAN WG1#88bis, dated Apr. 3-7, 2017, 46 pages.
(Continued)

*Primary Examiner* — Chi Ho A Lee
(74) *Attorney, Agent, or Firm* — Fish & Richardson P.C.

(57) ABSTRACT

The present invention provides a method for transmitting a random access channel (RACH). Particularly, the method includes receiving PRACH configuration information including information about a slot (RACH slot) available for transmission of the RACH and information indicating a subcarrier spacing for a PRACH, and transmitting a RACH preamble in the RACH slot on the basis of the PRACH configuration information and the subcarrier spacing, wherein the length of the RACH slot depends on the subcarrier spacing.

20 Claims, 24 Drawing Sheets

(Slot position, Starting OFDM symbol position for preamble, Preamble format #X, Number of sequence repetition, # of Preamble)

| $N^{th}$ SLOT ( N = 0,...,19, SS block periodicity = 20 ) |||||||||||||||
|---|---|---|---|---|---|---|---|---|---|---|---|---|---|
| 0 | 1 | 2 | 3 | 4 | 5 | 6 | 7 | 8 | 9 | 10 | 11 | 12 | 13 |
| CP | SEQ | SEQ | SEQ | SEQ | CP | SEQ | SEQ | SEQ | SEQ | | | | |
| RACH slot |||||  RACH slot |||||||||

{N, 0, Preamble format #1, 4 , 1}  {N, 5, Preamble format #1, 4, 1}

Related U.S. Application Data

(60) Provisional application No. 62/557,096, filed on Sep. 11, 2017, provisional application No. 62/507,752, filed on May 17, 2017, provisional application No. 62/501,086, filed on May 3, 2017.

(51) Int. Cl.
*H04W 74/00* (2009.01)
*H04L 5/00* (2006.01)

(52) U.S. Cl.
CPC ......... *H04W 74/006* (2013.01); *H04W 74/08* (2013.01); *H04W 74/0866* (2013.01)

(56) References Cited

U.S. PATENT DOCUMENTS

| | | | |
|---|---|---|---|
| 2015/0326995 A1* | 11/2015 | Li | H04W 74/08 370/329 |
| 2016/0021681 A1* | 1/2016 | Nan | H04W 74/0866 370/329 |
| 2016/0286580 A1 | 9/2016 | Liu et al. | |
| 2017/0111933 A1 | 4/2017 | Wu | |
| 2017/0223743 A1 | 8/2017 | Lin et al. | |
| 2017/0230985 A1* | 8/2017 | Yamada | H04B 1/7103 |
| 2018/0077702 A1* | 3/2018 | McLellan | H04B 7/0408 |
| 2018/0167979 A1* | 6/2018 | Guo | H04W 16/28 |
| 2018/0270791 A1* | 9/2018 | Park | H04W 68/04 |
| 2018/0279380 A1* | 9/2018 | Jung | H04W 74/0833 |
| 2018/0310341 A1 | 10/2018 | Yerramalli et al. | |
| 2018/0331806 A1* | 11/2018 | Ly | H04L 5/0053 |
| 2018/0343682 A1* | 11/2018 | Tang | H04L 1/0006 |
| 2019/0014598 A1* | 1/2019 | Yoshimura | H04W 16/14 |
| 2019/0116614 A1* | 4/2019 | Li | H04W 74/085 |
| 2019/0246425 A1* | 8/2019 | Zhang | H04W 74/0808 |
| 2020/0008247 A1* | 1/2020 | Kwak | H04W 74/004 |
| 2020/0022087 A1* | 1/2020 | Dou | H04W 52/146 |

FOREIGN PATENT DOCUMENTS

| | | |
|---|---|---|
| WO | WO2017017583 | 2/2017 |
| WO | WO2017024582 | 2/2017 |
| WO | WO2017031725 | 3/2017 |

OTHER PUBLICATIONS

NTT DOCOMO, Inc., "NR PRACH design," 3GPP TSG RAN WG1 Meeting #88, dated Feb. 13-17, 2017, 10 pages.
Ericsson, "NR PRACH design," 3GPP TSG-RAN WG1 NR adhoc, dated Jan. 16-20, 2017, 22 pages.
Motorola Mobility et al., "PRACH for an NR carrier supporting multiple numerologies," 3GPP TSG RAN WG1 Meeting #88, dated Feb. 13-17, 2017, 3 pages.
NTT DOCOMO, Inc., "Discussion and evaluation on NR PRACH design," 3GPP TSG RAN WG1 Meeting #88bis, dated Apr. 3-7, 2017, 17 pages.
ZTE et al., R1-1611269, Considerations on SS burst design, 3GPP TSG RAN WG1 #87, 3GPP server open date (Nov. 5, 2016), 6 pages.
NTT DOCOMO et al., R1-1612721, Discussion and evaluation on NR-PSS/SSS design, 3GPP TSG RAN WG1 #87, 3GPP server open date (Nov. 5, 2016), 10 pages.
Huawei et al., R1-1611667, Unified single/multiple beam operations for initial access, 3GPP TSG RAN WG1 #87, 3GPP server open date (Nov. 5, 2016), 10 pages.
Samsung, R1-1612455, Initial access signal mapping and multiplexing for sub 6GHz, 3GPP TSG RAN WG1 #87, 3GPP server open date (Nov. 4, 2016), 5 pages.
Nokia, Alcatel-Lucent Shanghai Bell, "NR Physical Random Access Channel", R1-1702285, 3GPP TSG-RAN WG1#88, Athens, Greece, Feb. 13-17, 2017, 17 pages.
ZTE, ZTE Microelectronics, "Remaining minimum system information", R1-1704362, 3GPP TSG RAN WG1 Meeting #88bis, Spokane, USA, Apr. 3-7, 2017, 10 pages.
LG Electronics, "Discussion on system information delivery", R1-1704866, 3GPP TSG RAN WG1 Meeting #88bis, Spokane, USA, Apr. 3-7, 2017, 4 pages.
Ericsson, "NR PRACH design", R1-1702127, 3GPP TSG-RAN WG1 Meeting #88, Athens, Greece, Feb. 13-17, 2017, 19 pages.
Ericsson, "Remaining NR-RACH preamble format details", R1-1714040, 3GPP TSG RAN WG1 Meeting #90, Prague, Czech Republic, Aug. 21-25, 2017, 5 pages.
Extended European Search Report in European Application No. 18793764.4, dated Feb. 6, 2020, 9 pages.
United States Office Action in U.S. Appl. No. 16/064,993, dated Feb. 5, 2020, 23 pages.
Japanese Office Action in Japanese Application No. 2019-535297, dated Jul. 7, 2020, 4 pages (with English translation).
India Office Action in India Application No. 201927021807, dated Nov. 24, 2020, 9 pages.
Nokia, Alcatel-Lucent Shanghai Bell, "NR Physical Random Access Channel", R1-174942, 3GPP TSG-RAN WG1#88bis, Spokane, USA, Apr. 3-7, 2017, 41 pages.
European Office Action in EP Appln. No. 18793764.4, dated Feb. 10, 2021, 7 pages.
LG Electronics, "Discussion on PRACH preamble format details," R1-1717930, 3GPP TSG RAN WG1 Meeting #90bis, Prague, CZ, Oct. 9-13, 2017, 8 pages.

\* cited by examiner

FIG. 19

(Slot position, Starting OFDM symbol position for preamble, Preamble format #X, Number of sequence repetition, # of Preamble)

| 0 | 1 | 2 | 3 | 4 | 5 | 6 | 7 | 8 | 9 | 10 | 11 | 12 | 13 |
|---|---|---|---|---|---|---|---|---|---|----|----|----|----|
| CP | SEQ | SEQ | SEQ | SEQ | CP | SEQ | SEQ | SEQ | SEQ | | | | |

$N^{th}$ SLOT (N = 0,...,19, SS block periodicity = 20)

RACH slot        RACH slot

{N, 0, Preamble format #1, 4, 1} {N, 5, Preamble format #1, 4, 1}

FIG. 20

| root code index | ZC index (OCC index, Cyclic shift version) | | | | | | | |
|---|---|---|---|---|---|---|---|---|
| | (0,0) | (0,1) | (0,2) | (0,3) | (1,0) | (1,1) | (1,2) | (1,3) |
| 15 | SS block #N | | | | | | | |
| 27 | | | | | | | | |
| 127 | SS block #N+1 | | | | | | | |
| 138 | | | | | | | | |

METHOD AND APPARATUS FOR TRANSMITTING AND RECEIVING RANDOM ACCESS CHANNEL

CROSS-REFERENCE TO RELATED APPLICATIONS

This application is a continuation of U.S. application Ser. No. 16/064,993, filed on Jun. 21, 2018, which is a National Stage application under 35 U.S.C. § 371 of International Application No. PCT/KR2018/005120, filed on May 3, 2018, which claims the benefit of U.S. Provisional Application No. 62/557,096, filed on Sep. 11, 2017, U.S. Provisional Application No. 62/507,752, filed on May 17, 2017, and U.S. Provisional Application No. 62/501,086, filed on May 3, 2017. The disclosures of the prior applications are incorporated by reference in their entirety.

TECHNICAL FIELD

The present invention relates to a method for transmitting and receiving a random access channel and an apparatus therefor, and more specifically, to a method for transmitting and receiving a RACH slot for a random access channel by changing the length of the RACH slot according to PRACH configuration and an apparatus therefor.

BACKGROUND ART

As a larger number of communication devices require larger communication traffic according to the current trends, a next-generation 5G system which is a wireless broadband communication system evolving from LTE is required. In such a next-generation 5G system called NewRAT, communication scenarios are divided into enhanced mobile broadband (eMBB), ultra-reliability and low-latency communication (URLLC), massive machine-type communications (mMTC), etc.

Here, eMBB is a next-generation mobile communication scenario having characteristics of high spectrum efficiency, a high user experienced data rate and a high peak data rate and URLLC is a next-generation mobile communication scenario having characteristics of ultra-reliable, ultra-low latency, ultra-high availability and the like (e.g., V2X, emergency service and remote control). mMTC is a next-generation mobile communication scenario having characteristics of low cost, low energy, short packets, and massive connectivity (e.g., IoT).

DISCLOSURE

Technical Problem

An object of the present invention is to provide a method for transmitting and receiving a random access channel and an apparatus therefor.

Technical tasks obtainable from the present invention are not limited by the above-mentioned technical task. Other unmentioned technical tasks can be clearly understood from the following description by those having ordinary skill in the technical field to which the present invention pertains.

Technical Solution

According to an embodiment of the present invention, a method for transmitting a random access channel (RACH) by a UE in a wireless communication system includes: receiving PRACH configuration information including information about a slot (RACH slot) available for transmission of the RACH and information indicating a subcarrier spacing for a PRACH; and transmitting a RACH preamble in the RACH slot on the basis of the PRACH configuration information and the subcarrier spacing, wherein the length of the RACH slot depends on the subcarrier spacing.

Here, the PRACH configuration information may further include start symbol index information indicating the first symbol for a RACH resource among symbols in the RACH slot, and the start symbol index may be identical for all RACH slots indicated by the PRACH configuration information.

Further, the start symbol index may be 0 or 2.

Further, the PRACH configuration information may indicate a frame including the RACH slot, and the number of slots included in the frame may be proportional to the subcarrier spacing.

Further, the RACH slot may be repeatedly mapped according to periodicity corresponding to the PRACH configuration information.

Further, the length of the RACH slot may be inversely proportional to the subcarrier spacing when the RACH preamble uses a short sequence having a length of 139.

AUE transmitting a random access channel (RACH) in a wireless communication system according to the present invention includes: a transceiver for transmitting/receiving radio signals to/from a base station; and a processor connected to the transceiver and configured to control the transceiver, wherein the processor controls the transceiver to receive PRACH configuration information including information about a slot (RACH slot) available for transmission of the RACH and information indicating a subcarrier spacing for a PRACH and controls the transceiver to transmit a RACH preamble in the RACH slot on the basis of the PRACH configuration information and the subcarrier spacing, and the length of the RACH slot depends on the subcarrier spacing.

Here, the PRACH configuration information may further include start symbol index information indicating the first symbol for a RACH resource among symbols in the RACH slot, and the start symbol index may be identical for all RACH slots indicated by the PRACH configuration information.

Further, the start symbol index may be 0 or 2.

Further, the PRACH configuration information may indicate a frame including the RACH slot, and the number of slots included in the frame may be proportional to the subcarrier spacing.

Further, the RACH slot may be repeatedly mapped according to periodicity corresponding to the PRACH configuration information.

Further, the length of the RACH slot may be inversely proportional to the subcarrier spacing when the RACH preamble uses a short sequence having a length of 139.

A method for receiving a random access channel (RACH) by a base station in a wireless communication system according to the present invention includes: transmitting PRACH configuration information including information about a slot (RACH slot) available for transmission of the RACH and information indicating a subcarrier spacing for a PRACH; and detecting a RACH preamble transmitted in the RACH slot on the basis of the PRACH configuration information and the subcarrier spacing, wherein the length of the RACH slot depends on the subcarrier spacing.

A base station receiving a random access channel (RACH) in a wireless communication system according to the present invention includes: a transceiver for transmitting/receiving radio signals to/from a UE; and a processor connected to the transceiver and configured to control the transceiver, wherein the processor controls the transceiver to transmit PRACH configuration information including information about a slot (RACH slot) available for transmission of the RACH and information indicating a subcarrier spacing for a PRACH and controls the transceiver to detect a RACH preamble transmitted in the RACH slot on the basis of the PRACH configuration information and the subcarrier spacing, and the length of the RACH slot depends on the subcarrier spacing.

Advantageous Effects

According to the present invention, a UE can generate and transmit acknowledgement information per CBG included in data received in one or more slots.

It will be appreciated by persons skilled in the art that that the effects that could be achieved with the present invention are not limited to what has been particularly described hereinabove and other advantages of the present invention will be more clearly understood from the following detailed description taken in conjunction with the accompanying drawings.

DESCRIPTION OF DRAWINGS

FIGS. 17 to 23 illustrate embodiments of methods of configuring RACH resources and methods of allocating RACH resources.

BEST MODE

Figure 1:
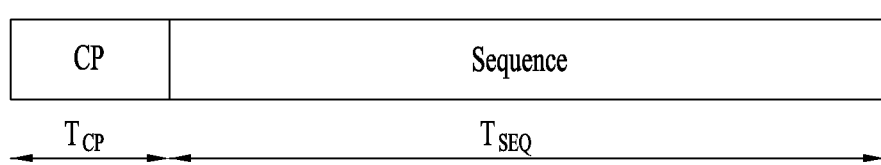
FIG. 1 illustrates a random access preamble format in LTE/LTE-A.

Reference will now be made in detail to the exemplary embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details.

In some instances, known structures and devices are omitted or are shown in block diagram form, focusing on important features of the structures and devices, so as not to obscure the concept of the present invention. The same reference numbers will be used throughout this specification to refer to the same or like parts.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. LTE-advanced (LTE-A) is an evolved version of 3GPP LTE. For convenience of description, it is assumed that the present invention is applied to 3GPP based communication system, e.g. LTE/LTE-A, NR. However, the technical features of the present invention are not limited thereto. For example, although the following detailed description is given based on a mobile communication system corresponding to a 3GPP LTE/LTE-A/NR system, aspects of the present invention that are not specific to 3GPP LTE/LTE-A/NR are applicable to other mobile communication systems.

For example, the present invention is applicable to contention based communication such as Wi-Fi as well as non-contention based communication as in the 3GPP LTE/LTE-A system in which an eNB allocates a DL/UL time/frequency resource to a UE and the UE receives a DL signal and transmits a UL signal according to resource allocation of the eNB. In a non-contention based communication scheme, an access point (AP) or a control node for controlling the AP allocates a resource for communication between the UE and the AP, whereas, in a contention based communication scheme, a communication resource is occupied through contention between UEs which desire to access the AP. The contention based communication scheme will now be described in brief. One type of the contention based communication scheme is carrier sense multiple access (CSMA). CSMA refers to a probabilistic media access control (MAC) protocol for confirming, before a node or a communication device transmits traffic on a shared transmission medium (also called a shared channel) such as a frequency band, that there is no other traffic on the same shared transmission medium. In CSMA, a transmitting device determines whether another transmission is being performed before attempting to transmit traffic to a receiving device. In other words, the transmitting device attempts to detect presence of a carrier from another transmitting device before attempting to perform transmission. Upon sensing the carrier, the transmitting device waits for another transmission device which is performing transmission to finish transmission, before performing transmission thereof. Consequently, CSMA can be a communication scheme based on the principle of "sense before transmit" or "listen before talk". A scheme for avoiding collision between transmitting devices in the contention based communication system using CSMA includes carrier sense multiple access with collision detection (CSMA/CD) and/or carrier sense multiple access with collision avoidance (CSMA/CA). CSMA/CD is a collision detection scheme in a wired local area network (LAN) environment. In CSMA/CD, a personal computer (PC) or a server which desires to perform communication in an Ethernet environment first confirms whether communication occurs on a network and, if another device carries data on the network, the PC or the server waits and then transmits data. That is, when two or more users (e.g. PCs, UEs, etc.) simultaneously transmit data, collision occurs between simultaneous transmission and CSMA/CD is a scheme for flexibly transmitting data by monitoring collision. A transmitting device using CSMA/CD adjusts data transmission thereof by sensing data transmission performed by another device using a specific rule. CSMA/CA is a MAC protocol specified in IEEE 802.11 standards. A wireless LAN (WLAN) system conforming to IEEE 802.11 standards does not use CSMA/CD which has been used in IEEE 802.3 standards and uses CA, i.e. a collision avoidance scheme. Transmission devices always sense carrier of a network and, if the network is empty, the transmission devices wait for determined time according to locations thereof registered in a list and then transmit data. Various methods are used to determine priority of the transmission devices in the list and to reconfigure priority. In a system according to some versions of IEEE 802.11 standards, collision may occur and, in this case, a collision sensing procedure is performed. A transmission device using CSMA/CA avoids collision between data transmission thereof and data transmission of another transmission device using a specific rule.

In embodiments of the present invention described below, the term "assume" may mean that a subject to transmit a channel transmits the channel in accordance with the corresponding "assumption". This may also mean that a subject to receive the channel receives or decodes the channel in a form conforming to the "assumption", on the assumption that the channel has been transmitted according to the "assumption".

In the present invention, puncturing a channel on a specific resource means that the signal of the channel is mapped to the specific resource in the procedure of resource mapping of the channel, but a portion of the signal mapped to the punctured resource is excluded in transmitting the channel. In other words, the specific resource which is punctured is counted as a resource for the channel in the procedure of resource mapping of the channel, a signal mapped to the specific resource among the signals of the channel is not actually transmitted. The receiver of the channel receives, demodulates or decodes the channel, assuming that the signal mapped to the specific resource is not transmitted. On the other hand, rate-matching of a channel on a specific resource means that the channel is never mapped to the specific resource in the procedure of resource mapping of the channel, and thus the specific resource is not used for transmission of the channel. In other words, the rate-matched resource is not counted as a resource for the channel in the procedure of resource mapping of the channel. The receiver of the channel receives, demodulates, or decodes the channel, assuming that the specific rate-matched resource is not used for mapping and transmission of the channel.

In the present invention, a user equipment (UE) may be a fixed or mobile device. Examples of the UE include various devices that transmit and receive user data and/or various kinds of control information to and from a base station (BS). The UE may be referred to as a terminal equipment (TE), a mobile station (MS), a mobile terminal (MT), a user terminal (UT), a subscriber station (SS), a wireless device, a personal digital assistant (PDA), a wireless modem, a handheld device, etc. In addition, in the present invention, a BS generally refers to a fixed station that performs communication with a UE and/or another BS, and exchanges various kinds of data and control information with the UE and another BS. The BS may be referred to as an advanced base station (ABS), a node-B (NB), an evolved node-B (eNB), a base transceiver system (BTS), an access point (AP), a processing server (PS), etc. Particularly, a BS of a UTRAN is referred to as a Node-B, a BS of an E-UTRAN is referred to as an eNB, and a BS of a new radio access technology network is referred to as a gNB. In describing the present invention, a BS will be referred to as a gNB.

In the present invention, a node refers to a fixed point capable of transmitting/receiving a radio signal through communication with a UE. Various types of gNBs may be used as nodes irrespective of the terms thereof. For example, a BS, a node B (NB), an e-node B (eNB), a pico-cell eNB (PeNB), a home eNB (HeNB), gNB, a relay, a repeater, etc. may be a node. In addition, the node may not be a gNB. For example, the node may be a radio remote head (RRH) or a radio remote unit (RRU). The RRH or RRU generally has a lower power level than a power level of a gNB. Since the RRH or RRU (hereinafter, RRH/RRU) is generally connected to the gNB through a dedicated line such as an optical cable, cooperative communication between RRH/RRU and the gNB can be smoothly performed in comparison with cooperative communication between gNBs connected by a radio line. At least one antenna is installed per node. The antenna may mean a physical antenna or mean an antenna port or a virtual antenna.

In the present invention, a cell refers to a prescribed geographical area to which one or more nodes provide a communication service. Accordingly, in the present invention, communicating with a specific cell may mean communicating with a gNB or a node which provides a communication service to the specific cell. In addition, a DL/UL signal of a specific cell refers to a DL/UL signal from/to a gNB or a node which provides a communication service to the specific cell. A node providing UL/DL communication services to a UE is called a serving node and a cell to which UL/DL communication services are provided by the serving node is especially called a serving cell. Furthermore, channel status/quality of a specific cell refers to channel status/quality of a channel or communication link formed between a gNB or node which provides a communication service to the specific cell and a UE. In the 3GPP based communication system, the UE may measure DL channel state received from a specific node using cell-specific reference signal(s) (CRS(s)) transmitted on a CRS resource and/or channel state information reference signal(s) (CSI-RS(s)) transmitted on a CSI-RS resource, allocated by antenna port(s) of the specific node to the specific node.

Meanwhile, a 3GPP based communication system uses the concept of a cell in order to manage radio resources and a cell associated with the radio resources is distinguished from a cell of a geographic region.

A "cell" of a geographic region may be understood as coverage within which a node can provide service using a carrier and a "cell" of a radio resource is associated with bandwidth (BW) which is a frequency range configured by the carrier. Since DL coverage, which is a range within which the node is capable of transmitting a valid signal, and UL coverage, which is a range within which the node is capable of receiving the valid signal from the UE, depends upon a carrier carrying the signal, the coverage of the node may be associated with coverage of the "cell" of a radio resource used by the node. Accordingly, the term "cell" may be used to indicate service coverage of the node sometimes, a radio resource at other times, or a range that a signal using a radio resource can reach with valid strength at other times.

Meanwhile, the 3GPP communication standards use the concept of a cell to manage radio resources. The "cell" associated with the radio resources is defined by combination of downlink resources and uplink resources, that is, combination of DL CC and UL CC. The cell may be configured by downlink resources only, or may be configured by downlink resources and uplink resources. If carrier aggregation is supported, linkage between a carrier frequency of the downlink resources (or DL CC) and a carrier frequency of the uplink resources (or UL CC) may be indicated by system information. For example, combination of the DL resources and the UL resources may be indicated by linkage of system information block type 2 (SIB2). The carrier frequency means a center frequency of each cell or CC. A cell operating on a primary frequency may be referred to as a primary cell (Pcell) or PCC, and a cell operating on a secondary frequency may be referred to as a secondary cell (Scell) or SCC. The carrier corresponding to the Pcell on downlink will be referred to as a downlink primary CC (DL PCC), and the carrier corresponding to the Pcell on uplink will be referred to as an uplink primary CC (UL PCC). A Scell means a cell that may be configured after completion of radio resource control (RRC) connection establishment and used to provide additional radio resources. The Scell may form a set of serving cells for the UE together with the Pcell in accordance with capabilities of the UE. The carrier corresponding to the Scell on the downlink will be referred to as downlink secondary CC (DL SCC), and the carrier corresponding to the Scell on the uplink will be referred to as uplink secondary CC (UL SCC). Although the UE is in RRC-CONNECTED state, if it is not configured by carrier aggregation or does not support carrier aggregation, a single serving cell configured by the Pcell only exists.

3GPP based communication standards define DL physical channels corresponding to resource elements carrying information derived from a higher layer and DL physical signals corresponding to resource elements which are used by a physical layer but which do not carry information derived from a higher layer. For example, a physical downlink shared channel (PDSCH), a physical broadcast channel (PBCH), a physical multicast channel (PMCH), a physical control format indicator channel (PCFICH), a physical downlink control channel (PDCCH), and a physical hybrid ARQ indicator channel (PHICH) are defined as the DL physical channels, and a reference signal and a synchronization signal are defined as the DL physical signals. A reference signal (RS), also called a pilot, refers to a special waveform of a predefined signal known to both a BS and a UE. For example, a cell-specific RS (CRS), a UE-specific RS (UE-RS), a positioning RS (PRS), and channel state information RS (CSI-RS) may be defined as DL RSs. Meanwhile, the 3GPP LTE/LTE-A standards define UL physical channels corresponding to resource elements carrying information derived from a higher layer and UL physical signals corresponding to resource elements which are used by a physical layer but which do not carry information derived from a higher layer. For example, a physical uplink shared channel (PUSCH), a physical uplink control channel (PUCCH), and a physical random access channel (PRACH) are defined as the UL physical channels, and a demodulation reference signal (DM RS) for a UL control/data signal and a sounding reference signal (SRS) used for UL channel measurement are defined as the UL physical signals.

In the present invention, a physical downlink control channel (PDCCH), a physical control format indicator channel (PCFICH), a physical hybrid automatic retransmit request indicator channel (PHICH), and a physical downlink shared channel (PDSCH) refer to a set of time-frequency resources or resource elements (REs) carrying downlink control information (DCI), a set of time-frequency resources or REs carrying a control format indicator (CFI), a set of time-frequency resources or REs carrying downlink acknowledgement (ACK)/negative ACK (NACK), and a set of time-frequency resources or REs carrying downlink data, respectively. In addition, a physical uplink control channel (PUCCH), a physical uplink shared channel (PUSCH) and a physical random access channel (PRACH) refer to a set of time-frequency resources or REs carrying uplink control information (UCI), a set of time-frequency resources or REs carrying uplink data and a set of time-frequency resources or REs carrying random access signals, respectively. In the present invention, in particular, a time-frequency resource or RE that is assigned to or belongs to PDCCH/PCFICH/PHICH/PDSCH/PUCCH/PUSCH/PRACH is referred to as PDCCH/PCFICH/PHICH/PDSCH/PUCCH/PUSCH/PRACH RE or PDCCH/PCFICH/PHICH/PDSCH/PUCCH/PUSCH/PRACH time-frequency resource, respectively. Therefore, in the present invention, PUCCH/PUSCH/PRACH transmission of a UE is conceptually identical to UCI/uplink data/random access signal transmission on PUSCH/PUCCH/PRACH, respectively. In addition, PDCCH/PCFICH/PHICH/PDSCH transmission of a gNB is conceptually identical to downlink data/DCI transmission on PDCCH/PCFICH/PHICH/PDSCH, respectively.

Hereinafter, OFDM symbol/subcarrier/RE to or for which CRS/DMRS/CSI-RS/SRS/UE-RS/TRS is assigned or configured will be referred to as CRS/DMRS/CSI-RS/SRS/UE-RS/TRS symbol/carrier/subcarrier/RE. For example, an OFDM symbol to or for which a tracking RS (TRS) is assigned or configured is referred to as a TRS symbol, a subcarrier to or for which the TRS is assigned or configured is referred to as a TRS subcarrier, and an RE to or for which the TRS is assigned or configured is referred to as a TRS RE. In addition, a subframe configured for transmission of the TRS is referred to as a TRS subframe. Moreover, a subframe in which a broadcast signal is transmitted is referred to as a broadcast subframe or a PBCH subframe and a subframe in which a synchronization signal (e.g. PSS and/or SSS) is transmitted is referred to a synchronization signal subframe or a PSS/SSS subframe. OFDM symbol/subcarrier/RE to or for which PSS/SSS is assigned or configured is referred to as PSS/SSS symbol/subcarrier/RE, respectively.

In the present invention, a CRS port, a UE-RS port, a CSI-RS port, and a TRS port refer to an antenna port configured to transmit a CRS, an antenna port configured to transmit a UE-RS, an antenna port configured to transmit a CSI-RS, and an antenna port configured to transmit a TRS, respectively. Antenna ports configured to transmit CRSs may be distinguished from each other by the locations of REs occupied by the CRSs according to CRS ports, antenna ports configured to transmit UE-RSs may be distinguished from each other by the locations of REs occupied by the UE-RSs according to UE-RS ports, and antenna ports configured to transmit CSI-RSs may be distinguished from each other by the locations of REs occupied by the CSI-RSs according to CSI-RS ports. Therefore, the term CRS/UE-RS/CSI-RS/TRS ports may also be used to indicate a pattern of REs occupied by CRSs/UE-RSs/CSI-RSs/TRSs in a predetermined resource region. In the present invention, both a DMRS and a UE-RS refer to RSs for demodulation and, therefore, the terms DMRS and UE-RS are used to refer to RSs for demodulation.

For terms and technologies which are not described in detail in the present invention, reference can be made to the standard document of 3GPP LTE/LTE-A, for example, 3GPP TS 36.211, 3GPP TS 36.212, 3GPP TS 36.213, 3GPP TS 36.321, and 3GPP TS 36.331 and the standard document of 3GPP NR, for example, 3GPP TS 38.211, 3GPP TS 38.212, 3GPP 38.213, 3GPP 38.214, 3GPP 38.215, 3GPP TS 38.321, and 3GPP TS 36.331.

In an LTE/LTE-A system, when a UE is powered on or desires to access a new cell, the UE perform an initial cell search procedure including acquiring time and frequency synchronization with the cell and detecting a physical layer cell identity $N^{cell}_{ID}$ of the cell. To this end, the UE may receive synchronization signals, for example, a primary synchronization signal (PSS) and a secondary synchronization signal (SSS), from an eNB to thus establish synchronization with the eNB and acquire information such as a cell identity (ID). After the initial cell search procedure, the UE may perform a random access procedure to complete access to the eNB. To this end, the UE may transmit a preamble through a physical random access channel (PRACH) and receive a response message to the preamble through a PDCCH and a PDSCH. After performing the aforementioned procedures, the UE may perform PDCCH/PDSCH reception and PUSCH/PUCCH transmission as a normal UL/DL transmission procedure. The random access procedure is also referred to as a random access channel (RACH) procedure. The random access procedure is used for various purposes including initial access, adjustment of UL synchronization, resource assignment, and handover.

After transmitting the RACH preamble, the UE attempts to receive a random access response (RAR) within a preset time window. Specifically, the UE attempts to detect a PDCCH with a random access radio network temporary identifier (RA-RNTI) (hereinafter, RA-RNTI PDCCH) (e.g., CRC is masked with RA-RNTI on the PDCCH) in the time window. In detecting the RA-RNTI PDCCH, the UE checks the PDSCH corresponding to the RA-RNTI PDCCH for presence of an RAR directed thereto. The RAR includes timing advance (TA) information indicating timing offset information for UL synchronization, UL resource allocation information (UL grant information), and a temporary UE identifier (e.g., temporary cell-RNTI (TC-RNTI)). The UE may perform UL transmission (of, e.g., Msg3) according to the resource allocation information and the TA value in the RAR. HARQ is applied to UL transmission corresponding to the RAR. Accordingly, after transmitting Msg3, the UE may receive acknowledgement information (e.g., PHICH) corresponding to Msg3.

FIG. 1 illustrates a random access preamble format in a legacy LTE/LTE-A system.

In the legacy LTE/LTE-A system, a random access preamble, i.e., a RACH preamble, includes a cyclic prefix having a length $T_{CP}$ and a sequence part having a length $T_{SEQ}$ in a physical layer. The parameter values $T_{CP}$ and $T_{SEQ}$ are listed in the following table, and depend on the frame structure and the random access configuration. Higher layers control the preamble format. In the 3GPP LTE/LTE-A system, PRACH configuration information is signaled through system information and mobility control information of a cell. The PRACH configuration information indicates a root sequence index, a cyclic shift unit $N_{CS}$ of a Zadoff-Chu sequence, the length of the root sequence, and a preamble format, which are to be used for a RACH procedure in the cell. In the 3GPP LTE/LTE-A system, a PRACH opportunity, which is a timing at which the preamble format and the RACH preamble may be transmitted, is indicated by a PRACH configuration index, which is a part of the RACH configuration information (refer to Section 5.7 of 3GPP TS 36.211 and "PRACH-Config" of 3GPP TS 36.331). The length of the Zadoff-Chu sequence used for the RACH preamble is determined according to the preamble format (refer to Table 4)

TABLE 1

| Preamble format | $T_{CP}$ | $T_{SEQ}$ |
| --- | --- | --- |
| 0 | $3168 \cdot T_s$ | $24576 \cdot T_s$ |
| 1 | $21024 \cdot T_s$ | $24576 \cdot T_s$ |
| 2 | $6240 \cdot T_s$ | $2 \cdot 24576 \cdot T_s$ |
| 3 | $21024 \cdot T_s$ | $2 \cdot 24576 \cdot T_s$ |
| 4 | $448 \cdot T_s$ | $4096 \cdot T_s$ |

In the LTE/LTE-A system, the RACH preamble is transmitted in a UL subframe. The transmission of a random access preamble is restricted to certain time and frequency resources. These resources are called PRACH resources, and enumerated in increasing order of the subframe number within the radio frame and the PRBs in the frequency domain such that index 0 correspond to the lowest numbered PRB and subframe within the radio frame. Random access resources are defined according to the PRACH configuration index (refer to the standard document of 3GPP TS 36.211). The PRACH configuration index is given by a higher layer signal (transmitted by an eNB).

The sequence part of the RACH preamble (hereinafter, preamble sequence) uses a Zadoff-Chu sequence. The preamble sequences for RACH are generated from Zadoff-Chu sequences with zero correlation zone, generated from one or several root Zadoff-Chu sequences. The network configures the set of preamble sequences the UE is allowed to use. In the legacy LTE/LTE-A system, there are 64 preambles available in each cell. The set of 64 preamble sequences in a cell is found by including first, in the order of increasing cyclic shift, all the available cyclic shifts of a root Zadoff-Chu sequence with the logical index RACH_ROOT_SE- QUENCE, where RACH_ROOT_SEQUENCE is broadcasted as part of the system information. Additional preamble sequences, in case 64 preambles cannot be generated from a single root Zadoff-Chu sequence, are obtained from the root sequences with the consecutive logical indexes until all the 64 sequences are found. The logical root sequence order is cyclic: the logical index 0 is consecutive to 837. The relation between a logical root sequence index and physical root sequence index u is given by Table 2 and Table 3 for preamble formats 0~3 and 4, respectively.

TABLE 2

| Logical root sequence number | Physical root sequence number u (in increasing order of 상기 corresponding logical sequnce number) |
|---|---|
| 0~23 | 129, 710, 140, 699, 120, 719, 210, 629, 168, 671, 84, 755, 105, 734, 93, 746, 70, 769, 60, 779, 2, 837, 1, 838 |
| 24~29 | 56, 783, 112, 727, 148, 691 |
| 30~35 | 80, 759, 42, 797, 40, 799 |
| 36~41 | 35, 804, 73, 766, 146, 693 |
| 42~51 | 31, 808, 28, 811, 30, 809, 27, 812, 29, 810 |
| 52~63 | 24, 815, 48, 791, 68, 771, 74, 765, 178, 661, 136, 703 |
| 64~75 | 86, 753, 78, 761, 43, 796, 39, 800, 20, 819, 21, 818 |
| 76~89 | 95, 744, 202, 637, 190, 649, 181, 658, 137, 702, 125, 714, 151, 688 |
| 90~115 | 217, 622, 128, 711, 142, 697, 122, 717, 203, 636, 118, 721, 110, 729, 89, 750, 103, 736, 61, 778, 55, 784, 15, 824, 14, 825 |
| 116~135 | 12, 827, 23, 816, 34, 805, 37, 802, 46, 793, 207, 632, 179, 660, 145, 694, 130, 709, 223, 616 |
| 136~167 | 228, 611, 227, 612, 132, 707, 133, 706, 143, 696, 135, 704, 161, 678, 201, 638, 173, 666, 106, 733, 83, 756, 91, 748, 66, 773, 53, 786, 10, 829, 9, 830 |
| 168~203 | 7, 832, 8, 831, 16, 823, 47, 792, 64, 775, 57, 782, 104, 735, 101, 738, 108, 731, 208, 631, 184, 655, 197, 642, 191, 648, 121, 718, 141, 698, 149, 690, 216, 623, 218, 621 |
| 204~263 | 152, 687, 144, 695, 134, 705, 138, 701, 199, 640, 162, 677, 176, 663, 119, 720, 158, 681, 164, 675, 174, 665, 171, 668, 170, 669, 87, 752, 169, 670, 88, 751, 107, 732, 81, 758, 82, 757, 100, 739, 98, 741, 71, 768, 59, 780, 65, 774, 50, 789, 49, 790, 26, 813, 17, 822, 13, 826, 6, 833 |
| 264~327 | 5, 834, 33, 806, 51, 788, 75, 764, 99, 740, 96, 743, 97, 742, 166, 673, 172, 667, 175, 664, 187, 652, 163, 676, 185, 654, 200, 639, 114, 725, 189, 650, 115, 724, 194, 645, 195, 644, 192, 647, 182, 657, 157, 682, 156, 683, 211, 628, 154, 685, 123, 716, 139, 700, 212, 627, 153, 686, 213, 626, 215, 624, 150, 689 |
| 328~383 | 225, 614, 224, 615, 221, 618, 220, 619, 127, 712, 147, 692, 124, 715, 193, 646, 205, 634, 206, 633, 116, 723, 160, 679, 186, 653, 167, 672, 79, 760, 85, 754, 77, 762, 92, 747, 58, 781, 62, 777, 69, 770, 54, 785, 36, 803, 32, 807, 25, 814, 18, 821, 11, 828, 4, 835 |
| 384~455 | 3, 836, 19, 820, 22, 817, 41, 798, 38, 801, 44, 795, 52, 787, 45, 794, 63, 776, 67, 772, 72, 767, 76, 763, 94, 745, 102, 737, 90, 749, 109, 730, 165, 674, 111, 728, 209, 630, 204, 635, 117, 722, 188, 651, 159, 680, 198, 641, 113, 726, 183, 656, 180, 659, 177, 662, 196, 643, 155, 684, 214, 625, 126, 713, 131, 708, 219, 620, 222, 617, 226, 613 |
| 456~513 | 230, 609, 232, 607, 262, 577, 252, 587, 418, 421, 416, 423, 413, 426, 411, 428, 376, 463, 395, 444, 283, 556, 285, 554, 379, 460, 390, 449, 363, 476, 384, 455, 388, 451, 386, 453, 361, 478, 387, 452, 360, 479, 310, 529, 354, 485, 328, 511, 315, 524, 337, 502, 349, 490, 335, 504, 324, 515 |
| 514~561 | 323, 516, 320, 519, 334, 505, 359, 480, 295, 544, 385, 454, 292, 547, 291, 548, 381, 458, 399, 440, 380, 459, 397, 442, 369, 470, 377, 462, 410, 429, 407, 432, 281, 558, 414, 425, 247, 592, 277, 562, 271, 568, 272, 567, 264, 575, 259, 580 |
| 562~629 | 237, 602, 239, 600, 244, 595, 243, 596, 275, 564, 278, 561, 250, 589, 246, 593, 417, 422, 248, 591, 394, 445, 393, 446, 370, 469, 365, 474, 300, 539, 299, 540, 364, 475, 362, 477, 298, 541, 312, 527, 313, 526, 314, 525, 353, 486, 352, 487, 343, 496, 327, 512, 350, 489, 326, 513, 319, 520, 332, 507, 333, 506, 348, 491, 347, 492, 322, 517 |
| 630~659 | 330, 509, 338, 501, 341, 498, 340, 499, 342, 497, 301, 538, 366, 473, 401, 438, 371, 468, 408, 431, 375, 464, 249, 590, 269, 570, 238, 601, 234, 605 |
| 660~707 | 257, 582, 273, 566, 255, 584, 254, 585, 245, 594, 251, 588, 412, 427, 372, 467, 282, 557, 403, 436, 396, 443, 392, 447, 391, 448, 382, 457, 389, 450, 294, 545, 297, 542, 311, 528, 344, 495, 345, 494, 318, 521, 331, 508, 325, 514, 321, 518 |
| 708~729 | 346, 493, 339, 500, 351, 488, 306, 533, 289, 550, 400, 439, 378, 461, 374, 465, 415, 424, 270, 569, 241, 598 |
| 730~751 | 231, 608, 260, 579, 268, 571, 276, 563, 409, 430, 398, 441, 290, 549, 304, 535, 308, 531, 358, 481, 316, 523 |
| 752~765 | 293, 546, 288, 551, 284, 555, 368, 471, 253, 586, 256, 583, 263, 576 |
| 766~777 | 242, 597, 274, 565, 402, 437, 383, 456, 357, 482, 329, 510 |
| 778~789 | 317, 522, 307, 532, 286, 553, 287, 552, 266, 573, 261, 578 |
| 790~795 | 236, 603, 303, 536, 356, 483 |
| 796~803 | 355, 484, 405, 434, 404, 435, 406, 433 |
| 804~809 | 235, 604, 267, 572, 302, 537 |
| 810~815 | 309, 530, 265, 574, 233, 606 |

TABLE 2-continued

| Logical root sequence number | Physical root sequence number u (in increasing order of 상기 corresponding logical sequnce number) |
|---|---|
| 816~819 | 367, 472, 296, 543 |
| 820~837 | 336, 503, 305, 534, 373, 466, 280, 559, 279, 560, 419, 420, 240, 599, 258, 581, 229, 610 |

TABLE 3

| Logical root sequence number | Physical root sequence number u (in increasing order of the corresponding logical sequence number) | | | | | | | | | | | | | | | | | | | |
|---|---|---|---|---|---|---|---|---|---|---|---|---|---|---|---|---|---|---|---|---|
| 0-19 | 1 | 138 | 2 | 137 | 3 | 136 | 4 | 135 | 5 | 134 | 6 | 133 | 7 | 132 | 8 | 131 | 9 | 130 | 10 | 129 |
| 20-39 | 11 | 128 | 12 | 127 | 13 | 126 | 14 | 125 | 15 | 124 | 16 | 123 | 17 | 122 | 18 | 121 | 19 | 120 | 20 | 119 |
| 40-59 | 21 | 118 | 22 | 117 | 23 | 116 | 24 | 115 | 25 | 114 | 26 | 113 | 27 | 112 | 28 | 111 | 29 | 110 | 30 | 109 |
| 60-79 | 31 | 108 | 32 | 107 | 33 | 106 | 34 | 105 | 35 | 104 | 36 | 103 | 37 | 102 | 38 | 101 | 39 | 100 | 40 | 99 |
| 80-99 | 41 | 98 | 42 | 97 | 43 | 96 | 44 | 95 | 45 | 94 | 46 | 93 | 47 | 92 | 48 | 91 | 49 | 90 | 50 | 89 |
| 100-119 | 51 | 88 | 52 | 87 | 53 | 86 | 54 | 85 | 55 | 84 | 56 | 83 | 57 | 82 | 58 | 81 | 59 | 80 | 60 | 79 |
| 120-137 | 61 | 78 | 62 | 77 | 63 | 76 | 64 | 75 | 65 | 74 | 66 | 73 | 67 | 72 | 68 | 71 | 69 | 70 | — | — |
| 138-837 | | | | | | | | | | N/A | | | | | | | | | | | u-th root Zadoff-Chu sequence is defined by the following equation.

$$x_u(n) = e^{-j\frac{\pi u n(n+1)}{N_{ZC}}}, 0 \le n \le N_{ZC} - 1 \quad \text{Equation 1}$$

TABLE 4

| Preamble format | $N_{ZC}$ |
|---|---|
| 0~3 | 839 |
| 4 | 139 |

From the u-th root Zadoff-Chu sequence, random access preambles with zero correlation zones of length $N_{ZC}-1$ are defined by cyclic shifts according to $x_{u,v}(n)=x_u((n+C_v) \mod N_{ZC})$, where the cyclic shift is given by the following equation.

$$C_v = \begin{cases} vN_{CS} & v = 0, 1, \ldots, \lfloor N_{ZC}/N_{CS} \rfloor - 1, N_{CS} \ne 0 & \text{for unrestricted sets} \\ 0 & N_{CS} = 0 & \text{for unrestricted sets} \\ d_{start}\lfloor v/n_{shift}^{RA} \rfloor + (v \bmod n_{shift}^{RA})N_{CS} & v = 0, 1, \ldots, n_{shift}^{RA} n_{group}^{RA} + \bar{n}_{shift}^{RA} - 1 & \text{for restricted sets} \end{cases} \quad \text{Equation 2}$$

$N_{CS}$ is given by Table 5 for preamble formats 0~3 and by Table 6 for preamble format 4.

TABLE 5

| zeroCorrelationZoneConfig | $N_{CS}$ value | |
|---|---|---|
| | Unrestricted set | Restricted set |
| 0 | 0 | 15 |
| 1 | 13 | 18 |
| 2 | 15 | 22 |
| 3 | 18 | 26 |
| 4 | 22 | 32 |
| 5 | 26 | 38 |
| 6 | 32 | 46 |
| 7 | 38 | 55 |
| 8 | 46 | 68 |
| 9 | 59 | 82 |
| 10 | 76 | 100 |
| 11 | 93 | 128 |
| 12 | 119 | 158 |
| 13 | 167 | 202 |
| 14 | 279 | 237 |
| 15 | 419 | — |

TABLE 6

| zeroCorrelationZoneConfig | $N_{CS}$ value |
|---|---|
| 0 | 2 |
| 1 | 4 |
| 2 | 6 |
| 3 | 8 |
| 4 | 10 |
| 5 | 12 |
| 6 | 15 |
| 7 | N/A |
| 8 | N/A |
| 9 | N/A |
| 10 | N/A |
| 11 | N/A |
| 12 | N/A |
| 13 | N/A |
| 14 | N/A |
| 15 | N/A |

The parameter zeroCorrelationZoneConfig is provided by higher layers. The parameter High-speed-flag provided by higher layers determines if unrestricted set or restricted set shall be used.

The variable $d_u$ is the cyclic shift corresponding to a Doppler shift of magnitude $1/T_{SEQ}$ and is given by the following equation.

$$d_u = \begin{cases} p & 0 \le p < N_{ZC}/2 \\ N_{ZC} - p & \text{otherwise} \end{cases} \quad \text{Equation 3}$$

p is the smallest non-negative integer that fulfils (pu) mod $N_{ZC}$=1. The parameters for restricted sets of cyclic shifts depend on $d_u$. For $N_{ZC} \le d_u < N_{ZC}/3$, the parameters are given by the following equation.

$$n_{shift}^{RA} = \lfloor d_u/N_{CS} \rfloor$$

$$d_{start} = 2d_u + n_{shift}^{RA} N_{CS}$$

$$n_{group}^{RA} = \lfloor N_{ZC}/d_{start} \rfloor$$

$$\bar{n}_{shift}^{RA} = \max(\lfloor N_{ZC} - 2d_u - n_{group}^{RA} d_{start})/N_{CS} \rfloor, 0) \quad \text{Equation 4}$$

For $N_{ZC}/3 \le d_u < (N_{ZC}-N_{CS})/2$, the parameters are given by the following equation.

$$n_{shift}^{RA} = \lfloor (N_{ZC}-2d_u)/N_{CS} \rfloor$$

$$d_{start} = N_{ZC} - 2d_u + n_{shift}^{RA} N_{CS}$$

$$n_{group}^{RA} = \lfloor d_u/d_{start} \rfloor$$

$$\bar{n}_{shift}^{RA} = \min(\max(\lfloor d_u - n_{group}^{RA} d_{start})/N_{CS} \rfloor, 0), n_{shift}^{RA}) \quad \text{Equation 5}$$

For all other values of $d_n$, there are no cyclic shifts in the restricted set.

The time-continuous random access signal s(t) which is the baseband signal of RACH is defined by the following Equation.

$$s(t) = \beta_{PRACH} \sum_{k=0}^{N_{ZC}-1} \sum_{n=0}^{N_{ZC}-1} x_{u,v}(n) \cdot e^{-j\frac{2\pi nk}{N_{ZC}}} \cdot e^{j2\pi(k+\varphi+K(k_0+\frac{1}{2}))\Delta f_{RA}(t-T_{CP})} \quad \text{Equation 6}$$

where $0 \le t < T_{SEQ} - T_{CP}$, $\beta_{PRACH}$ is an amplitude scaling factor in order to conform to the transmit power specified in 3GPP TS 36.211, and $k_0 = n_{PRB}^{RA} N_{sc}^{RB} - N_{RB}^{UL} N_{sc}^{RB}/2$. $N_{sc}^{RB}$ denotes the number of subcarriers constituting one resource block (RB). $N_{RB}^{UL}$ denotes the number of RBs in a UL slot and depends on a UL transmission bandwidth. The location in the frequency domain is controlled by the parameter $n_{PRB}^{RA}$ is derived from the section 5.7.1 of 3GPP TS 36.211. The factor $K = \Delta f/\Delta f_{RA}$ accounts for the difference in subcarrier spacing between the random access preamble and uplink data transmission. The variable $\Delta f_{RA}$, the subcarrier spacing for the random access preamble, and the variable φ, a fixed offset determining the frequency-domain location of the random access preamble within the physical resource blocks, are both given by the following table.

TABLE 7

| Preamble format | $\Delta f_{RA}$ | φ |
|---|---|---|
| 0~3 | 1250 Hz | 7 |
| 4 | 7500 Hz | 2 |

In the LTE/LTE-A system, a subcarrier spacing $\Delta f$ is 15 kHz or 7.5 kHz. However, as given by Table 7, a subcarrier spacing $\Delta f_{RA}$ for a random access preamble is 1.25 kHz or 0.75 kHz.

As more communication devices have demanded higher communication capacity, there has been necessity of enhanced mobile broadband relative to legacy radio access technology (RAT). In addition, massive machine type communication for providing various services irrespective of time and place by connecting a plurality of devices and objects to each other is one main issue to be considered in future-generation communication. Further, a communication system design in which services/UEs sensitive to reliability and latency are considered is under discussion. The introduction of future-generation RAT has been discussed by taking into consideration enhanced mobile broadband communication, massive MTC, ultra-reliable and low-latency communication (URLLC), and the like. In current 3GPP, a study of the future-generation mobile communication system after EPC is being conducted. In the present invention, the corresponding technology is referred to as a new RAT (NR) or 5G RAT, for convenience.

An NR communication system demands that much better performance than a legacy fourth generation (4G) system be supported in terms of data rate, capacity, latency, energy consumption, and cost. Accordingly, the NR system needs to make progress in terms of bandwidth, spectrum, energy, signaling efficiency, and cost per bit.

<OFDM Numerology>

The new RAT system uses an OFDM transmission scheme or a similar transmission scheme. The new RAT system may follow the OFDM parameters different from OFDM parameters of the LTE system. Alternatively, the new RAT system may conform to numerology of the legacy LTE/LTE-A system but may have a broader system bandwidth (e.g., 100 MHz) than the legacy LTE/LTE-A system. One cell may support a plurality of numerologies. That is, UEs that operate with different numerologies may coexist within one cell.

<Subframe Structure>

In the 3GPP LTE/LTE-A system, radio frame is 10 ms (307,200 $T_s$) in duration. The radio frame is divided into 10 subframes of equal size. Subframe numbers may be assigned to the 10 subframes within one radio frame, respectively. Here, $T_s$ denotes sampling time where $T_s=1/(2048*15 \text{ kHz})$. The basic time unit for LTE is $T_s$. Each subframe is 1 ms long and is further divided into two slots. 20 slots are sequentially numbered from 0 to 19 in one radio frame. Duration of each slot is 0.5 ms. A time interval in which one subframe is transmitted is defined as a transmission time interval (TTI). Time resources may be distinguished by a radio frame number (or radio frame index), a subframe number (or subframe index), a slot number (or slot index), and the like. The TTI refers to an interval during which data can be scheduled. For example, in a current LTE/LTE-A system, a transmission opportunity of a UL grant or a DL grant is present every 1 ms and several transmission opportunities of the UL/DL grant are not present within a shorter time than 1 ms. Therefore, the TTI in the legacy LTE/LTE-A system is 1 ms.

Figure 2:
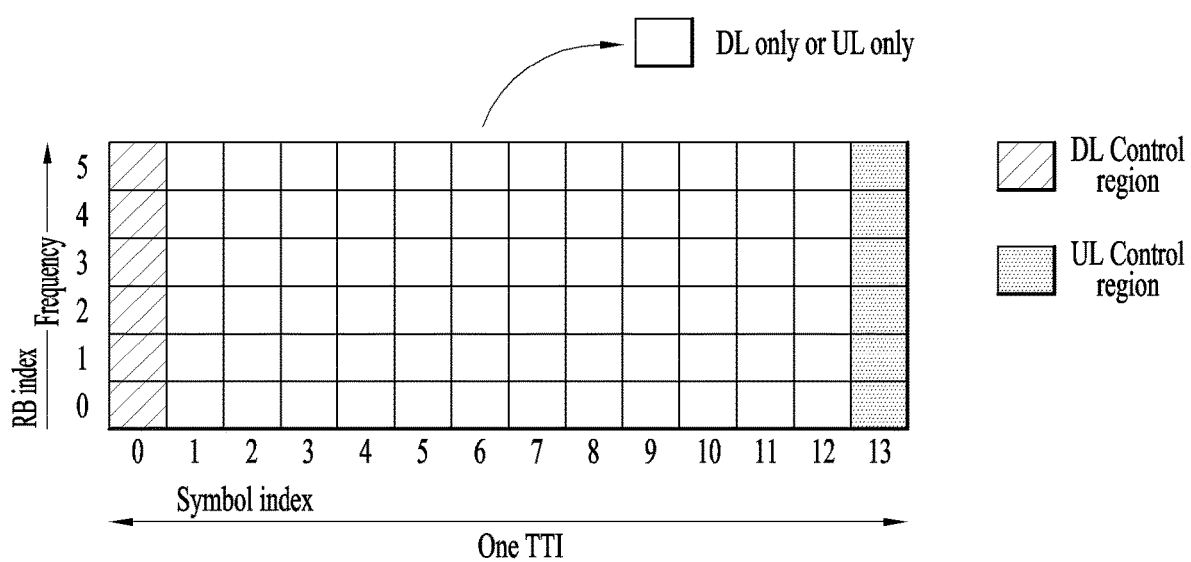
FIG. 2 illustrates a slot structure available in a new radio access technology (NR).

FIG. 2 illustrates a slot structure available in a new radio access technology (NR).

To minimize data transmission latency, in a 5G new RAT, a slot structure in which a control channel and a data channel are time-division-multiplexed is considered.

In FIG. 2, the hatched area represents the transmission region of a DL control channel (e.g., PDCCH) carrying the DCI, and the black area represents the transmission region of a UL control channel (e.g., PUCCH) carrying the UCI. Here, the DCI is control information that the gNB transmits to the UE. The DCI may include information on cell configuration that the UE should know, DL specific information such as DL scheduling, and UL specific information such as UL grant. The UCI is control information that the UE transmits to the gNB. The UCI may include a HARQ ACK/NACK report on the DL data, a CSI report on the DL channel status, and a scheduling request (SR).

In FIG. 2, the region of symbols from symbol index 1 to symbol index 12 may be used for transmission of a physical channel (e.g., a PDSCH) carrying downlink data, or may be used for transmission of a physical channel (e.g., PUSCH) carrying uplink data. According to the slot structure of FIG. 2, DL transmission and UL transmission may be sequentially performed in one slot, and thus transmission/reception of DL data and reception/transmission of UL ACK/NACK for the DL data may be performed in one slot. As a result, the time taken to retransmit data when a data transmission error occurs may be reduced, thereby minimizing the latency of final data transmission.

In such a slot structure, a time gap is needed for the process of switching from the transmission mode to the reception mode or from the reception mode to the transmission mode of the gNB and UE. On behalf of the process of switching between the transmission mode and the reception mode, some OFDM symbols at the time of switching from DL to UL in the slot structure are set as a guard period (GP).

In the legacy LTE/LTE-A system, a DL control channel is time-division-multiplexed with a data channel and a PDCCH, which is a control channel, is transmitted throughout an entire system band. However, in the new RAT, it is expected that a bandwidth of one system reaches approximately a minimum of 100 MHz and it is difficult to distribute the control channel throughout the entire band for transmission of the control channel. For data transmission/reception of a UE, if the entire band is monitored to receive the DL control channel, this may cause increase in battery consumption of the UE and deterioration in efficiency. Accordingly, in the present invention, the DL control channel may be locally transmitted or distributively transmitted in a partial frequency band in a system band, i.e., a channel band.

In the NR system, a basic transmission unit is a slot. A slot duration may consist of 14 symbols with a normal cyclic prefix (CP) or 12 symbols with an extended CP. The slot is scaled in time as a function of a used subcarrier spacing. That is, if the subcarrier spacing increases, the length of the slot is shortened. For example, when the number of symbols per slot is 14, the number of slots in a 10-ms frame is 10 at a subcarrier spacing of 15 kHz, 20 at a subcarrier spacing of 30 kHz, and 40 at a subcarrier spacing of 60 kHz. If a subcarrier spacing increases, the length of OFDM symbols is shortened. The number of OFDM symbols in a slot depends on whether the OFDM symbols have a normal CP or an extended CP and does not vary according to subcarrier spacing. A basic time unit used in the LTE system, $T_s$, is defined as $T_s=1/(15000*2048)$ seconds in consideration of a basic subcarrier spacing of 15 kHz and a maximum TFT size 2048 of the LTE system and corresponds to a sampling time for a subcarrier spacing of 15 kHz. In the NR system, various subcarrier lengths in addition to the subcarrier spacing of 15 kHz may be used. Since the subcarrier spacing and a corresponding time length are inversely proportional, an actual sampling time corresponding to subcarrier spacings greater than 15 kHz is shorter than $T_s=1/(15000*2048)$ seconds. For example, actual sampling times for subcarrier spacings of 30 kHz, 60 kHz, and 120 kHz will be $1/(2*15000*2048)$ seconds, $1/(4*15000*2048)$ seconds, and $1/(8*15000*2048)$ seconds, respectively.

<Analog Beamforming>

A recently discussed fifth generation (5G) mobile communication system is considering using an ultrahigh frequency band, i.e., a millimeter frequency band equal to or higher than 6 GHz, to transmit data to a plurality of users in a wide frequency band while maintaining a high transmission rate. In 3GPP, this system is used as NR and, in the present invention, this system will be referred to as an NR system. Since the millimeter frequency band uses too high a frequency band, a frequency characteristic thereof exhibits very sharp signal attenuation depending on distance. Therefore, in order to correct a sharp propagation attenuation characteristic, the NR system using a band of at least above 6 GHz uses a narrow beam transmission scheme to solve a coverage decrease problem caused by sharp propagation attenuation by transmitting signals in a specific direction so as to focus energy rather than in all directions. However, if a signal transmission service is provided using only one narrow beam, since a range serviced by one BS becomes narrow, the BS provides a broadband service by gathering a plurality of narrow beams.

In the millimeter frequency band, i.e., millimeter wave (mmW) band, the wavelength is shortened, and thus a plurality of antenna elements may be installed in the same area. For example, a total of 100 antenna elements may be installed in a 5-by-5 cm panel in a 30 GHz band with a wavelength of about 1 cm in a 2-dimensional array at intervals of 0.5. (wavelength). Therefore, in mmW, increasing the coverage or the throughput by increasing the beamforming (BF) gain using multiple antenna elements is taken into consideration.

As a method of forming a narrow beam in the millimeter frequency band, a beamforming scheme is mainly considered in which the BS or the UE transmits the same signal using a proper phase difference through a large number of antennas so that energy increases only in a specific direction. Such a beamforming scheme includes digital beamforming for imparting a phase difference to a digital baseband signal, analog beamforming for imparting a phase difference to a modulated analog signal using time latency (i.e., cyclic shift), and hybrid beamforming using both digital beamforming and analog beamforming. If a transceiver unit (TXRU) is provided for each antenna element to enable adjustment of transmit power and phase, independent beamforming is possible for each frequency resource. However, installing TXRU in all of the about 100 antenna elements is less feasible in terms of cost. That is, the millimeter frequency band needs to use numerous antennas to correct the sharp propagation attenuation characteristic. Digital beamforming requires as many radio frequency (RF) components (e.g., a digital-to-analog converter (DAC), a mixer, a power amplifier, a linear amplifier, etc.) as the number of antennas. Therefore, if digital beamforming is desired to be implemented in the millimeter frequency band, cost of communication devices increases. Hence, when a large number of antennas is needed as in the millimeter frequency band, use of analog beamforming or hybrid beamforming is considered. In the analog beamforming method, multiple antenna elements are mapped to one TXRU and a beam direction is adjusted using an analog phase shifter. This analog beamforming method may only make one beam direction in the whole band, and thus may not perform frequency selective beamforming (BF), which is disadvantageous. The hybrid BF method is an intermediate type of digital BF and analog BF and uses B TXRUs less in number than Q antenna elements. In the case of hybrid BF, the number of directions in which beams may be transmitted at the same time is limited to B or less, which depends on the method of collection of B TXRUs and Q antenna elements.

As mentioned above, digital BF may simultaneously transmit or receive signals in multiple directions using multiple beams by processing a digital baseband signal to be transmitted or received, whereas analog BF cannot simultaneously transmit or receive signals in multiple directions exceeding a coverage range of one beam by performing BF in a state in which an analog signal to be transmitted or received is modulated. Typically, the BS simultaneously performs communication with a plurality of users using broadband transmission or multi-antenna characteristics. If the BS uses analog or hybrid BF and forms an analog beam in one beam direction, the eNB communicates with only users included in the same analog beam direction due to an analog BF characteristic. A RACH resource allocation method and a resource use method of the BS according to the present invention, which will be described later, are proposed considering restrictions caused by the analog BF or hybrid BF characteristic.

<Hybrid Analog Beamforming>

Figure 3:
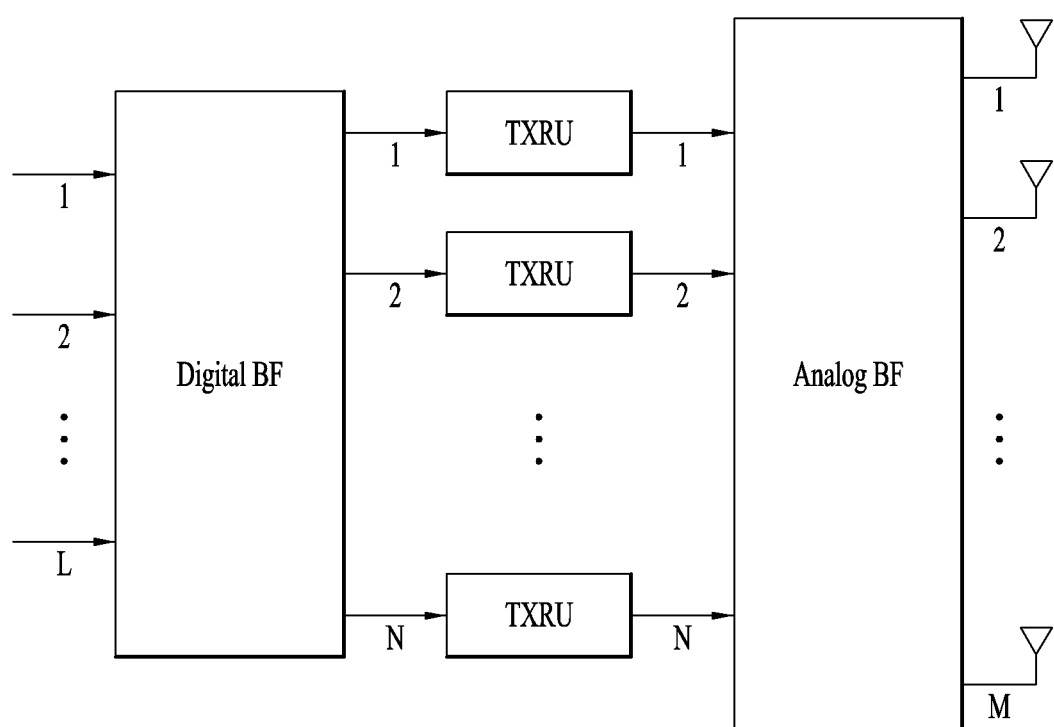
FIG. 3 abstractly illustrates a hybrid beamforming structure from the viewpoint of a transceiver unit (TXRU) and a physical antenna.

FIG. 3 abstractly illustrates TXRUs and a hybrid BF structure in terms of physical antennas.

When a plurality of antennas is used, a hybrid BF method in which digital BF and analog BF are combined is considered. Analog BF (or RF BF) refers to an operation in which an RF unit performs precoding (or combining). In hybrid BF, each of a baseband unit and the RF unit (also referred to as a transceiver) performs precoding (or combining) so that performance approximating to digital BF can be obtained while the number of RF chains and the number of digital-to-analog (D/A) (or analog-to-digital (A/D)) converters is reduced. For convenience, the hybrid BF structure may be expressed as N TXRUs and M physical antennas. Digital BF for L data layers to be transmitted by a transmitter may be expressed as an N-by-L matrix. Next, N converted digital signals are converted into analog signals through the TXRUs and analog BF expressed as an M-by-N matrix is applied to the analog signals. In FIG. 3, the number of digital beams is L and the number of analog beams is N. In the NR system, the BS is designed so as to change analog BF in units of symbols and efficient BF support for a UE located in a specific region is considered. If the N TXRUs and the M RF antennas are defined as one antenna panel, the NR system considers even a method of introducing plural antenna panels to which independent hybrid BF is applicable. In this way, when the BS uses a plurality of analog beams, since which analog beam is favorable for signal reception may differ according to each UE, a beam sweeping operation is considered so that, for at least a synchronization signal, system information, and paging, all UEs may have reception opportunities by changing a plurality of analog beams, that the BS is to apply, according to symbols in a specific slot or subframe.

Recently, a 3GPP standardization organization is considering network slicing to achieve a plurality of logical networks in a single physical network in a new RAT system, i.e., the NR system, which is a 5G wireless communication system. The logical networks should be capable of supporting various services (e.g., eMBB, mMTC, URLLC, etc.) having various requirements. A physical layer system of the NR system considers a method supporting an orthogonal frequency division multiplexing (OFDM) scheme using variable numerologies according to various services. In other words, the NR system may consider the OFDM scheme (or multiple access scheme) using independent numerologies in respective time and frequency resource regions.

Recently, as data traffic remarkably increases with appearance of smartphone devices, the NR system needs to support of higher communication capacity (e.g., data throughput). One method considered to raise the communication capacity is to transmit data using a plurality of transmission (or reception) antennas. If digital BF is desired to be applied to the multiple antennas, each antenna requires an RF chain (e.g., a chain consisting of RF elements such as a power amplifier and a down converter) and a D/A or A/D converter. This structure increases hardware complexity and consumes high power which may not be practical. Accordingly, when multiple antennas are used, the NR system considers the above-mentioned hybrid BF method in which digital BF and analog BF are combined.

Figure 4:
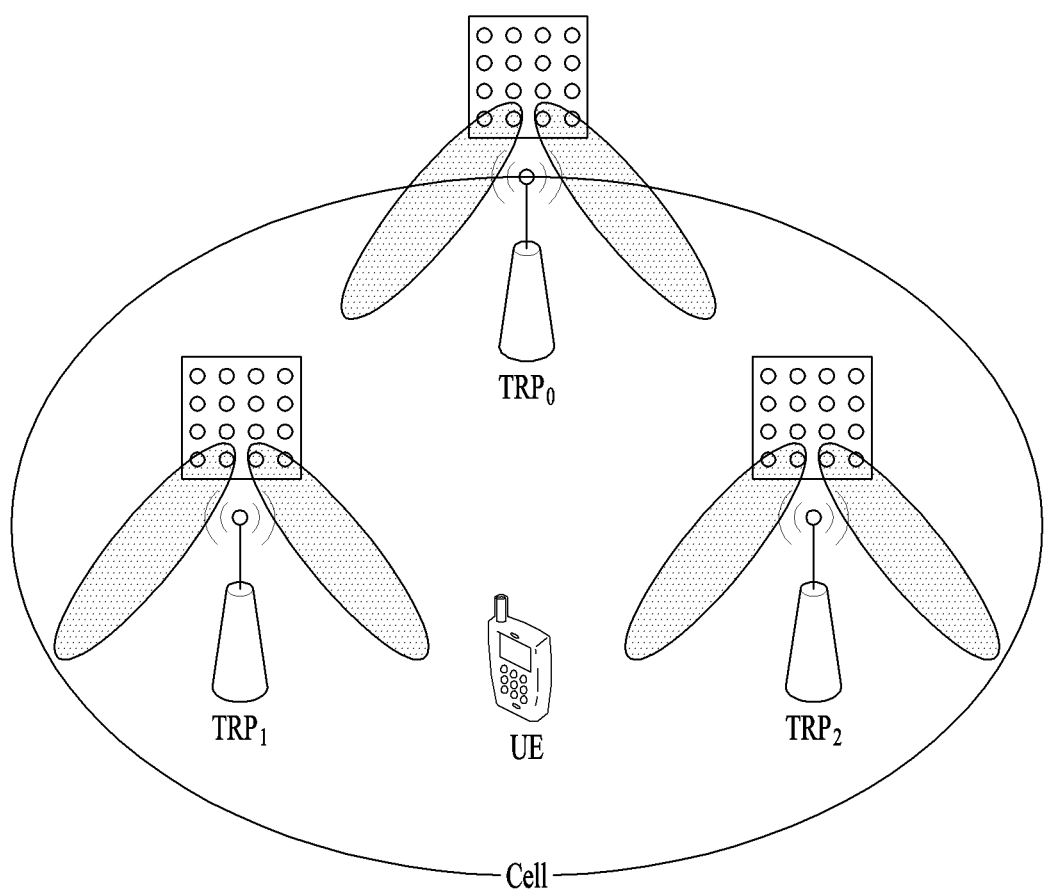
FIG. 4 illustrates a cell of a new radio access technology (NR).

FIG. 4 illustrates a cell of a new radio access technology (NR) system.

Referring to FIG. 4, in the NR system, a method in which a plurality of transmission and reception points (TRPs) form one cell is being discussed unlike a wireless communication system of legacy LTE in which one BS forms one cell. If the plural TRPs form one cell, seamless communication can be provided even when a TRP that provides a service to a UE is changed so that mobility management of the UE is facilitated.

In an LTE/LTE-A system, a PSS/SSS is transmitted omni-directionally. Meanwhile, a method is considered in which a gNB which uses millimeter wave (mmWave) transmits a signal such as a PSS/SSS/PBCH through BF while sweeping beam directions omni-directionally. Transmission/reception of a signal while sweeping beam directions is referred to as beam sweeping or beam scanning. In the present invention, "beam sweeping" represents a behavior of a transmitter and "beam scanning" represents a behavior of a receiver. For example, assuming that the gNB may have a maximum of N beam directions, the gNB transmits a signal such as a PSS/SSS/PBCH in each of the N beam directions. That is, the gNB transmits a synchronization signal such as the PSS/SSS/PBCH in each direction while sweeping directions that the gNB can have or the gNB desires to support. Alternatively, when the gNB can form N beams, one beam group may be configured by grouping a few beams and the PSS/SSS/PBCH may be transmitted/received with respect to each beam group. In this case, one beam group includes one or more beams. The signal such as the PSS/SSS/PBCH transmitted in the same direction may be defined as one synchronization (SS) block and a plurality of SS blocks may be present in one cell. When the plural SS blocks are present, SS block indexes may be used to distinguish between the SS blocks. For example, if the PSS/SSS/PBCH is transmitted in 10 beam directions in one system, the PSS/SSS/PBCH transmitted in the same direction may constitute one SS block and it may be understood that 10 SS blocks are present in the system. In the present invention, a beam index may be interpreted as an SS block index.

Figure 5:
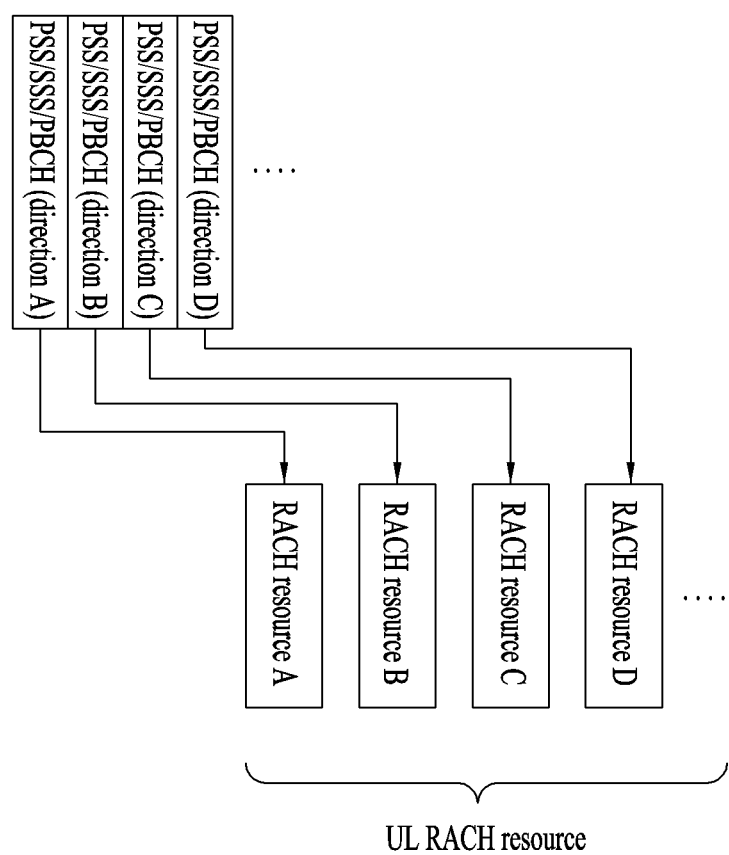
FIG. 5 illustrates SS block transmission and RACH resources linked to SS blocks.

FIG. 5 illustrates transmission of an SS block and a RACH resource linked to the SS block.

To communicate with one UE, the gNB should acquire an optimal beam direction between the gNB and the UE and should continuously track the optimal beam direction because the optimal beam direction is changed as the UE moves. A procedure of acquiring the optimal beam direction between the gNB and the UE is referred to as a beam acquisition procedure and a procedure of continuously tracking the optimal beam direction is referred to as a beam tracking procedure. The beam acquisition procedure is needed for 1) initial access in which the UE first attempts to access the gNB, 2) handover in which the UE is handed over from one gNB to another gNB, or 3) beam recovery for recovering from a state in which the UE and gNB cannot maintain an optimal communication state or enter a communication impossible state, i.e., beam failure, as a result of losing an optimal beam while performing beam tracking for searching for the optimal beam between the UE and the gNB.

In the case of the NR system which is under development, a multi-stage beam acquisition procedure is under discussion, for beam acquisition in an environment using multiple beams. In the multi-stage beam acquisition procedure, the gNB and the UE perform connection setup using a wide beam in an initial access stage and, after connection setup is ended, the gNB and the UE perform communication with optimal quality using a narrow band. In the present invention, although various methods for beam acquisition of the NR system are mainly discussed, the most actively discussed method at present is as follows.

1) The gNB transmits an SS block per wide beam in order for the UE to search for the gNB in an initial access procedure, i.e., performs cell search or cell acquisition, and to search for an optimal wide beam to be used in a first stage of beam acquisition by measuring channel quality of each wide beam. 2) The UE performs cell search for an SS block per beam and performs DL beam acquisition using a cell detection result of each beam. 3) The UE performs a RACH procedure in order to inform the gNB that the UE will access the gNB that the UE has discovered. 4) The gNB connects or associates the SS block transmitted per beam and a RACH resource to be used for RACH transmission, in order to cause the UE to inform the gNB of a result of the RACH procedure and simultaneously a result of DL beam acquisition (e.g., beam index) at a wide beam level. If the UE performs the RACH procedure using a RACH resource connected to an optimal beam direction that the UE has discovered, the gNB obtains information about a DL beam suitable for the UE in a procedure of receiving a RACH preamble.

<Beam Correspondence (BC)>

In a multi-beam environment, whether a UE and/or a TRP can accurately determine a transmission (Tx) or reception (Rx) beam direction between the UE and the TRP is problematic. In the multi-beam environment, signal transmission repetition or beam sweeping for signal reception may be considered according to a Tx/Rx reciprocal capability of the TRP (e.g., eNB) or the UE. The Tx/Rx reciprocal capability is also referred to as Tx/Rx beam correspondence (BC) in the TRP and the UE. In the multi-beam environment, if the Tx/Rx reciprocal capability in the TRP or the UE does not hold, the UE may not transmit a UL signal in a beam direction in which the UE has received a DL signal because an optimal path of UL may be different from an optimal path of DL. Tx/Rx BC in the TRP holds, if the TRP can determine a TRP Rx beam for UL reception based on DL measurement of UE for one or more Tx beams of the TRP and/or if the TRP can determine a TRP Tx beam for DL transmission based on UL measurement for one or more Rx beams of the TRP. Tx/Rx BC in the UE holds if the UE can determine a UE Rx beam for UL transmission based on DL measurement of UE for one or more Rx beams of the UE and/or if the UE can determine a UE Tx beam for DL reception according to indication of the TRP based on UL measurement for one or more Tx beams of the UE.

In the LTE system and the NR system, a RACH signal used for initial access to the gNB, i.e., initial access to the gNB through a cell used by the gNB, may be configured using the following elements.

Cyclic prefix (CP): This element serves to prevent interference generated from a previous/front (OFDM) symbol and group RACH preamble signals arriving at the gNB with various time delays into one time zone. That is, if the CP is configured to match a maximum radius of a cell, RACH preambles that UEs in the cell have transmitted in the same resource are included in a RACH reception window corresponding to the length of RACH preambles configured by the gNB for RACH reception. A CP length is generally set to be equal to or greater than a maximum round trip delay.

Preamble: A sequence used by the gNB to detect signal transmission is defined and the preamble serves to carry this sequence.

Guard time (GT): This element is defined to cause a RACH signal arriving at the gNB with delay from the farthest distance from the gNB on RACH coverage not to create interference with respect to a signal arriving after a RACH symbol duration. During this GT, the UE does not transmit a signal so that the GT may not be defined as the RACH signal.

Figure 6:
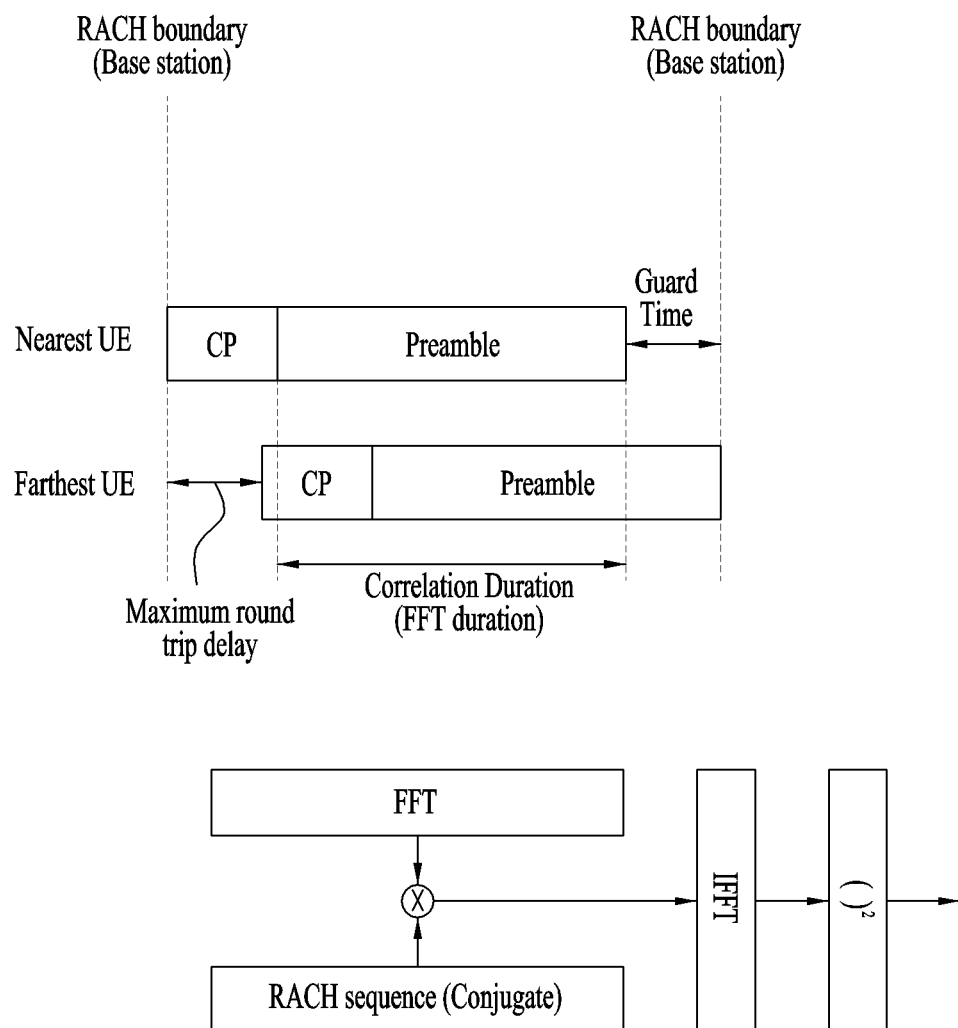
FIG. 6 illustrates a configuration/format of a random access channel (RACH) preamble and a receiver function.

FIG. 6 illustrates configuration/format of a RACH preamble and a receiver function.

The UE transmits a RACH signal through a designated RACH resource at a system timing of the gNB obtained through an SS. The gNB receives signals from multiple UEs. Generally, the gNB performs the procedure illustrated in FIG. 5 for RACH signal reception. Since a CP for the RACH signal is set to a maximum round trip delay or more, the gNB may configure an arbitrary point between the maximum round trip delay and the CP length as a boundary for signal reception. If the boundary is determined as a start point for signal reception and if correlation is applied to a signal of a length corresponding to a sequence length from the start point, the gNB may acquire information as to whether the RACH signal is present and information about the CP.

If a communication environment operated by the gNB such as a millimeter band uses multiple beams, the RACH signal arrives at the eNB from multiple directions and the gNB needs to detect the RACH preamble (i.e., PRACH) while sweeping beam directions to receive the RACH signal arriving from multiple directions. As mentioned above, when analog BF is used, the gNB performs RACH reception only in one direction at one timing. For this reason, it is necessary to design the RACH preamble and a RACH procedure so that the gNB may properly detect the RACH preamble. The present invention proposes the RACH preamble and/or the RACH procedure for a high frequency band to which the NR system, especially, BF, is applicable in consideration of the case in which BC of the gNB holds and the case in which BC does not hold.

Figure 7:
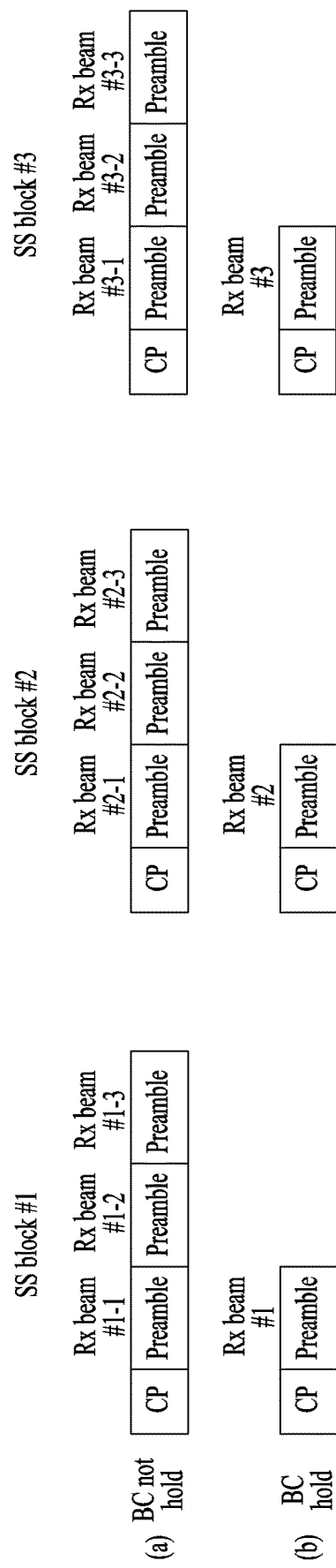
FIG. 7 illustrates receiving (Rx) beams formed in a gNB to receive a RACH preamble.

FIG. 7 illustrates a reception (Rx) beam formed at a gNB to receive a RACH preamble.

If BC does not hold, beam directions may be mismatched even when the gNB forms an Rx beam in a Tx beam direction of an SS block in a state in which a RACH resource is linked to the SS block. Therefore, a RACH preamble may be configured in a format illustrated in FIG. 7(a) so that the gNB may perform beam scanning for performing/attempting to perform RACH preamble detection in multiple directions while sweeping Rx beams. Meanwhile, if BC holds, since the RACH resource is linked to the SS block, the gNB may form an Rx beam in a direction used to transmit the SS block with respect to one RACH resource and detect the RACH preamble only in that direction. Therefore, the RACH preamble may be configured in a format illustrated in FIG. 7(b).

As described previously, a RACH signal and a RACH resource should be configured in consideration of two purposes of a DL beam acquisition report and a DL preferred beam report of the UE and beam scanning of the gNB according to BC.

Figure 8:
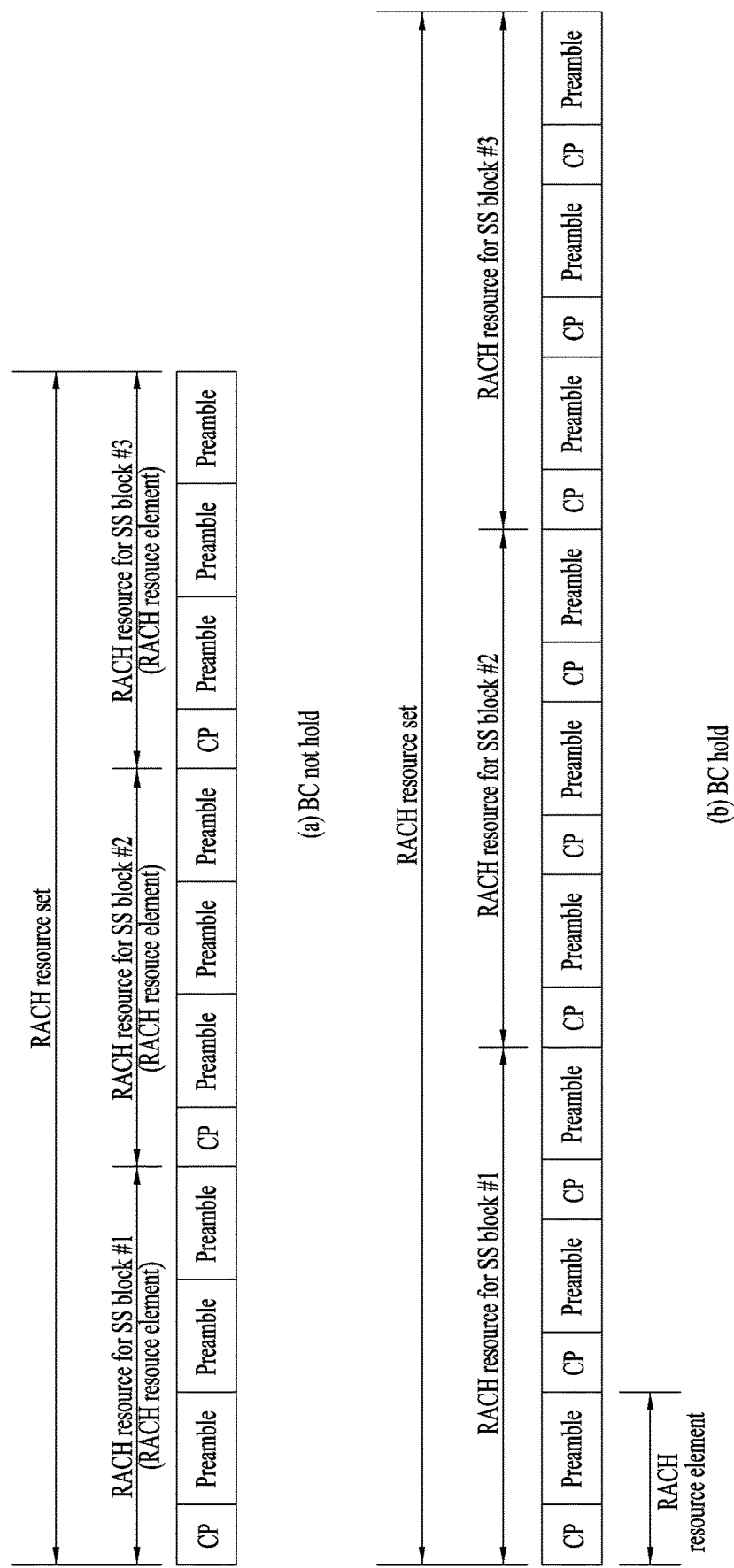
FIG. 8 is a diagram for describing terms used in the description of the present invention with respect to RACH signals and RACH resources.

FIG. 8 illustrates a RACH signal and a RACH resource to explain terms used to describe the present invention. In the present invention, the RACH signal may be configured as follows.

RACH resource element: The RACH resource element is a basic unit used when the UE transmits the RACH signal. Since different RACH resource elements may be used for RACH signal transmission by different UEs, respectively, a CP is inserted into the RACH signal in each RACH resource element. Protection for signals between UEs is already maintained by the CP and, therefore, a GT is not needed between RACH resource elements.

RACH resource: The RACH resource is defined as a set of concatenated RACH resource elements connected to one SS block. If RACH resources are consecutively allocated contiguously, two successive RACH resources may be used for signal transmission by different UEs, respectively, like the RACH resource elements. Therefore, the CP may be inserted into the RACH signal in each RACH resource. The GT is unnecessary between RACH resources because signal detection distortion caused by time delay is prevented by the CP. However, if only one RACH resource is configured, i.e., RACH resources are not consecutively configured, since a PUSCH/PUCCH may be allocated after the RACH resource, the GT may be inserted in front of the PUSCH/PUCCH.

RACH resource set: The RACH resource set is a set of concatenated RACH resources. If multiple SS blocks are present in a cell and RACH resources connected respectively to the multiple SS blocks are concatenated, the concatenated RACH resources may be defined as one RACH resource set. The GT is inserted into the last of the RACH resource set which is a part where the RACH resource set including RACH resources and another signal such as a PUSCH/PUCCH may be encountered. As mentioned above, since the GT is a duration during which a signal is not transmitted, the GT may not be defined as a signal. The GT is not illustrated in FIG. 8.

RACH preamble repetition: When a RACH preamble for Rx beam scanning of the gNB is configured, i.e., when the gNB configures a RACH preamble format so that the gNB may perform Rx beam scanning, if the same signal (i.e., same sequence) is repeated within the RACH preamble, the CP is not needed between the repeated signals because the repeated signals serve as the CP. However, when preambles are repeated within the RACH preamble using different signals, the CP is needed between the preambles. The GT is not needed between RACH preambles. Hereinafter, the present invention is described under the assumption that the same signal is repeated. For example, if the RACH preamble is configured in the form of 'CP+preamble+preamble', the present invention is described under the assumption that the preambles within the RACH preamble are configured by the same sequence.

FIG. 8 illustrates RACH resources for a plurality of SS blocks and RACH preambles in each RACH resource in terms of the gNB. The gNB attempts to receive a RACH preamble in each RACH resource in a time region in which the RACH resources are configured. The UE transmits a RACH preamble thereof through RACH resource(s) linked to specific SS block(s) (e.g., SS block(s) having better Rx quality) rather than transmitting the RACH preamble in each of RACH resources for all SS blocks of the cell. As mentioned above, different RACH resource elements or different RACH resources may be used to transmit RACH preambles by different UEs.

Figure 9:
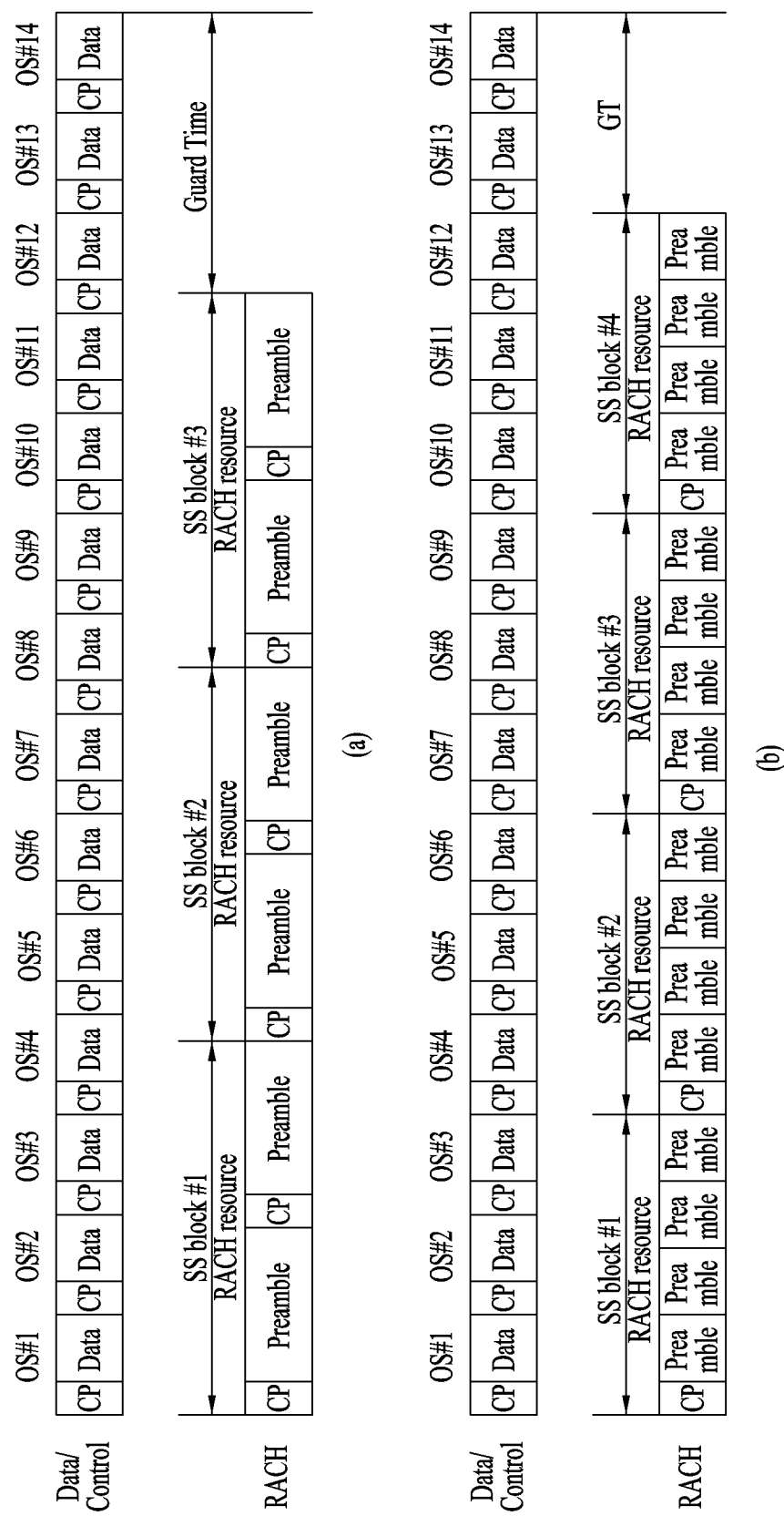
FIG. 9 illustrates a RACH resource set.

FIG. 9 illustrates a RACH resource set. FIG. 9(a) illustrates the case in which two RACH resource elements per RACH resource are configured in a cell of the gNB in which BC holds. FIG. 9(b) illustrates the case in which one RACH resource element per RACH resource is configured in the cell of the gNB in which BC holds. Referring to FIG. 9(a), two RACH preambles may be transmitted in a RACH resource linked to an SS block. Referring to FIG. 9(b), one RACH preamble may be transmitted in a RACH resource linked to an SS block.

A RACH resource set may be configured as illustrated in FIG. 9 so as to maximize the efficiency of a RACH resource using the RACH signal configuration characteristic described in FIG. 8. As illustrated in FIG. 9, in order to raise use/allocation efficiency of the RACH resource, RACH resources or RACH resource elements may be configured to be completely concatenated without allocating a blank duration between RACH resources in the RACH resource set.

However, if RACH resources are configured as illustrated in FIG. 9, the following problems may arise. 1) When BC holds and the gNB receives a RACH resource corresponding to SS block #N by forming a beam in the direction of SS block #N, since an Rx beam is changed at a middle of OFDM symbols (OSs) defined for a data or control channel, the gNB only partially uses resources other than a frequency resource allocated as the RACH resource. That is, as illustrated in FIG. 9(a), if the gNB forms an Rx beam to receive SS block #1, OS #4 cannot be used for the data channel or the control channel. 2) When BC does not hold and the gNB performs Rx beam scanning within a RACH resource element, the gNB may perform RACH preamble detection while receiving a data/control signal by forming an Rx beam on each of OSs at a boundary of OS #1/OS #2/OS #3 with respect to a RACH resource corresponding to SS block #1. However, when the gNB performs beam scanning for a RACH resource corresponding to SS block #2, a beam direction for receiving the data/control signal and a beam direction for receiving a RACH preamble are not matched in a duration corresponding to OS #4 so that a problem occurs in detecting the RACH preamble.

In summary, if the gNB performs beam scanning while changing the direction of an Rx beam for RACH signal reception and a timing at which the Rx beam is changed mismatches an OFDM symbol boundary defined for the data or control channel, there is a problem of lowering resource use/allocation efficiency of the data or control channel serviced in a frequency region other than a frequency resource allocated as the RACH resource. To solve this problem, the present invention proposes allocating a RACH resource as a structure aligned with an OFDM symbol boundary, in order for the gNB to perform RACH preamble detection while changing a beam direction in a multi-beam scenario and simultaneously for the gNB to use all radio resources other than the RACH resource for the data and control channels. When BC holds, by way of example, a RACH resource or a RACH preamble transmitted through the RACH resource may be aligned with an OFDM symbol boundary using two methods as illustrated in FIG. 10.

Figure 10:
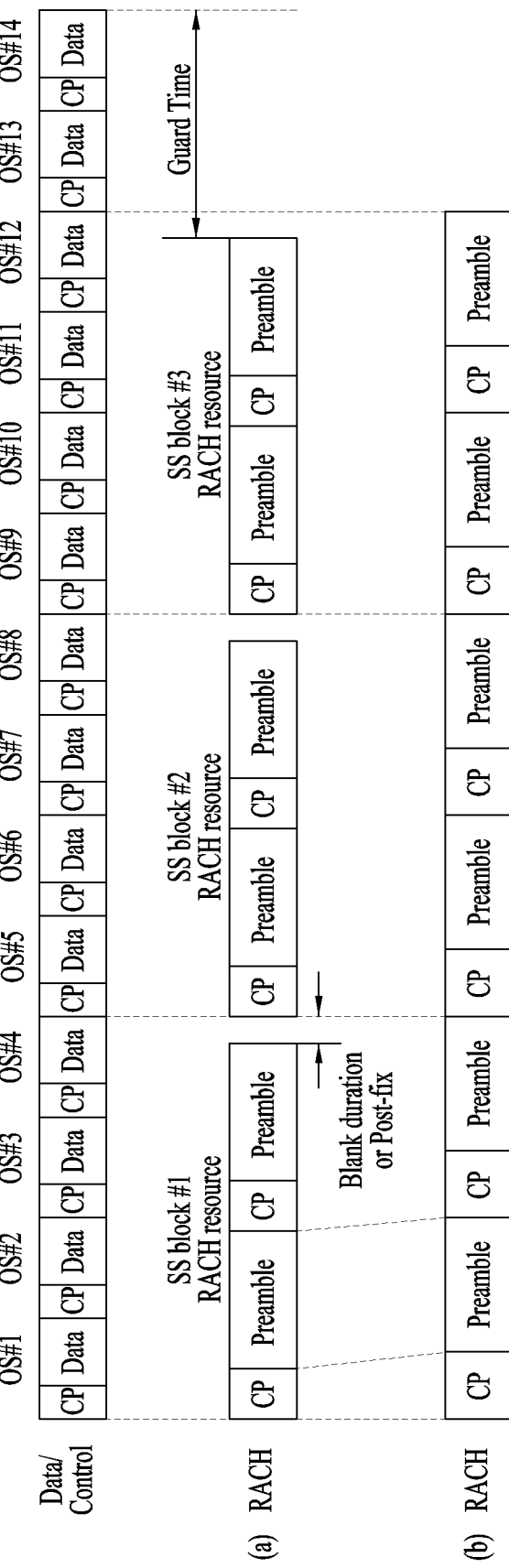
FIG. 10 is a diagram for describing the present invention with respect to RACH resource boundary alignment.

FIG. 10 illustrates boundary alignment of a RACH resource according to the present invention. An example illustrated in FIG. 10 corresponds to the case in which BS holds and two RACH resource elements can be transmitted on one RACH resource. When BC does not hold, one RACH preamble may be configured by one CP and a plurality of consecutive preambles as illustrated in FIG. 7(a) or FIG. 8(a). Even in this case, the present invention is applicable. Only one RACH resource element may be transmitted on one RACH resource and the present invention is applicable thereto.

1) One (hereinafter, Method 1) of methods for aligning an OFDM symbol boundary and a RACH resource boundary determines a CP length and a preamble length of a RACH preamble by taking into consideration RACH preamble detection capability by the gNB, coverage of the gNB, and a subcarrier spacing of the RACH preamble and then configure an RACH resource element using the CP length and the preamble length, as illustrated in FIG. 10(a). The gNB may configure the RACH resource by determining the number of RACH resource elements per RACH resource in consideration of the capacity of the RACH resource. The gNB configures RACH resource(s) such that a boundary of each of RACH resources which are to be consecutively used is aligned with a boundary of OFDM symbol(s) which are to be used for the data and control channels. In this case, a blank duration may occur between RACH resources. The blank duration may be configured as a duration during which no signals are transmitted. Alternatively, a signal may be additionally transmitted as a post-fix only to the last RACH resource element in the RACH resource. That is, the UE that transmits a RACH preamble using the last RACH resource element in the time domain among RACH resource elements in a RACH resource may add a post-fix signal to the RACH preamble thereof and then transmit the RACH preamble. The UE that transmits a RACH preamble using a RACH resource element other than the last RACH resource element may transmit the RACH preamble without adding the post-fix signal.

2) Another method (hereinafter, Method 2) among the methods of aligning the OFDM symbol boundary and the RACH resource boundary configures a CP length and a preamble length in order to align the RACH resource boundary with the OFDM symbol boundary as illustrated in FIG. 10(b). However, since the number of RACH resource elements in each RACH resource may vary, if the length of the RACH preamble is changed to match the OFDM symbol boundary, there is a danger of changing characteristics of a preamble sequence in the RACH preamble. That is, the length of a Zadoff-Chu (ZC) sequence used to generate a preamble is determined as 839 or 130 according to a preamble format as illustrated in Table 4. If the length of the preamble is changed in order to align the length of the RACH preamble with the OFDM symbol boundary, the characteristics of the ZC sequence which is the preamble sequence may vary. Therefore, if a RACH preamble format is determined and RACH resource elements per RACH resource are determined, the length of the RACH preamble may be fixed but a CP length may become greater than a length determined in configuring the RACH preamble format so that the RACH resource is aligned with the OFDM symbol boundary. That is, this method serves to align a RACH resource boundary, i.e., a RACH preamble boundary transmitted through the RACH resource with an OFDM symbol used to transmit the data/control channel (i.e., normal OFDM symbol) by fixing the length of each preamble in the RACH preamble and increasing the CP length to match the OFDM symbol boundary so as to maintain characteristics of the preamble sequence. In this case, only CP lengths of some RACH resource elements may be configured to be increased (i.e., only CP lengths of some RACH preambles are configured to be increased) or CP lengths of all RACH resource elements may be configured to be properly increased (i.e., a CP length of each RACH preamble is configured to be properly increased). For example, if the gNB configures the RACH resource in the time domain configured by OFDM symbols, the gNB configures a preamble format indicating a CP length and a sequence part length such that the sequence part length is a multiple of a positive integer of a preamble length obtained from a specific length (e.g., the length of a ZC sequence for a RACH) according to the number of preambles to be included in a corresponding RACH preamble and the CP length is equal to a value obtained by subtracting the sequence part length from a total length of the normal OFDM symbols. If the lengths of OFDM symbols are all the same, the RACH preamble format according to the present invention will be defined such that the sum of a multiple of a positive integer of a predefined preamble length (e.g., a preamble length obtained from a predefined length of a ZC sequence) and a CP length is a multiple of an OFDM symbol length. When the UE detects an SS block of a cell and generates a RACH preamble to be transmitted on a RACH resource connected to the SS block, the UE generates the RACH preamble by generating each preamble to be included in the RACH preamble using a sequence of a specific length (e.g., ZC sequence) according to a preamble format configured by the gNB and adding a CP to a front part of the preamble or repetition(s) of the preamble.

Method 1 and Method 2 may be equally applied even when the gNB performs Rx beam scanning because BC does not hold. When BC holds for Method 1 and Method 2, there is a high possibility that a RACH preamble is configured in a format including one preamble. Meanwhile, except that there is a high possibility that the RACH preamble is configured to include preamble repetition when BC does not hold, Method 1 and Method 2 described with reference to FIG. 10 may be equally applied to the case in which the gNB desires to perform Rx beam scanning because BS does not hold. For example, when BC does not hold so that the gNB desires to perform Rx beam scanning, the gNB configures and signals a preamble format (e.g., refer to FIG. 7(a) or FIG. 8(a)) in the form of including preamble repetition. Herein, the RACH resource may be configured in the form of Method 1 so as to monitor RACH preamble(s) by considering a duration from the end of one RACH resource to a part immediately before the start of the next RACH resource as a blank duration or a post-fix duration. Alternatively, the RACH resource may be configured in the form of Method 2 so as to monitor RACH preamble(s) in each RACH resource configured by the gNB under the assumption that the RACH preamble boundary is equal to the OFDM symbol boundary.

The RACH resource allocation method proposed in the present invention serves to efficiently use a frequency resource, other than a frequency resource occupied by the RACH resource, in one slot or multiple slots used for the RACH resource, as a data resource or a control channel resource. Therefore, for efficient use of the data/control channel resource considering the RACH resource, the gNB needs to schedule the data or control channel using information as to which unit is used to form a beam with respect to a slot to which the RACH resource is allocated. The UE may receive information as to which OFDM symbol unit is used when the gNB performs scheduling and transmit the data or control channel based on the information. To this end, two methods may be considered so that the gNB may schedule the data or control channel in a time region to which the RACH resource is allocated.

Mini Slot Allocation

When a channel is scheduled in a time region to which the RACH resource is allocated, since the scheduled channel should be included in one beam region, a time length of a resource to which the channel is allocated should be shorter than a time length of the RACH resource and a plurality of slots of a short length may be included for one RACH resource.

If the gNB operates by configuring a beam direction for each RACH resource and time units in which the gNB allocates a resource to the UE are not matched in a time region to which the RACH resource is allocated and in a time region to which the RACH resource is not allocated, the gNB should define a slot for scheduling in a time region occupied by the RACH resource and inform the UE of information related to the slot. Hereinafter, the slot used for scheduling in the time region occupied by the RACH resource will be referred to as a mini slot. In this structure, there are some considerations in order to transmit the data or control channel through the mini slot. For example, the following considerations are given.

Figure 11:
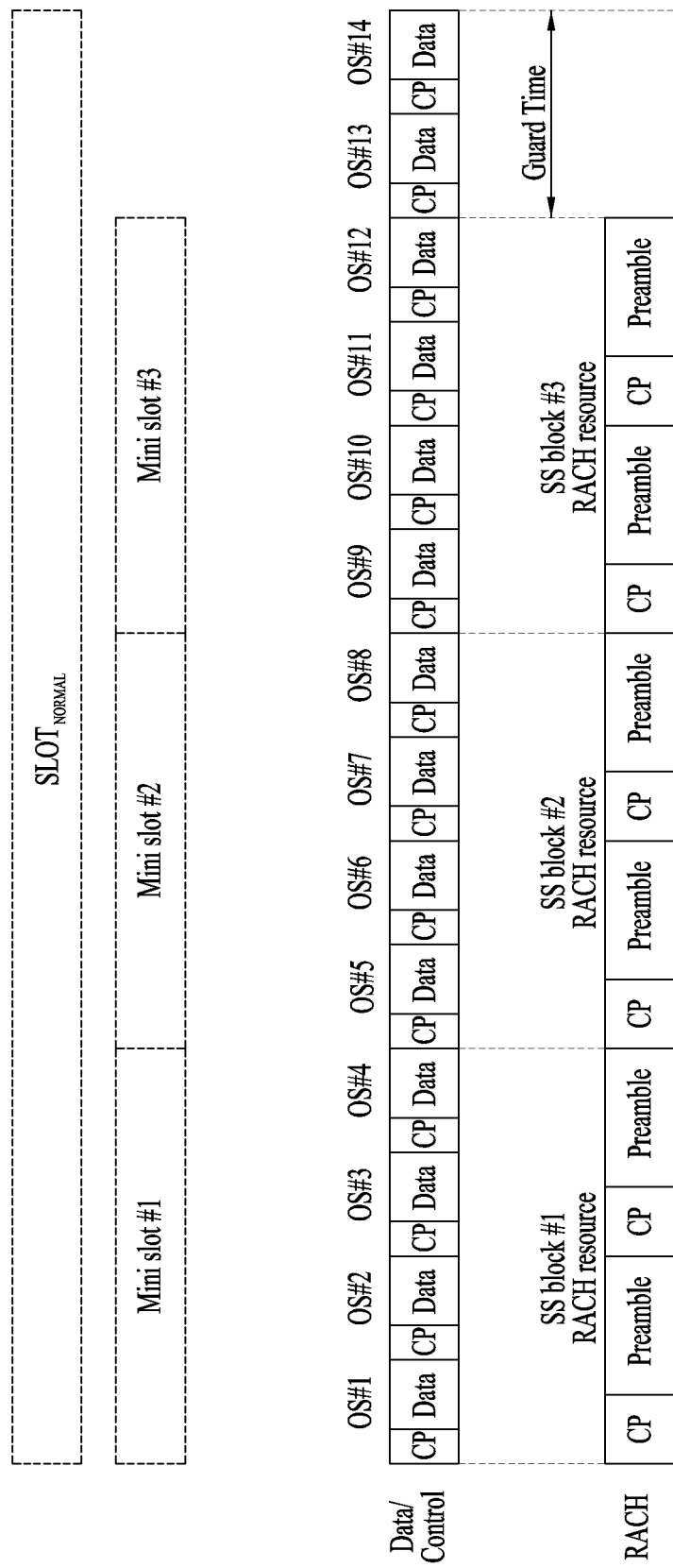
FIG. 11 illustrates a method of configuring a mini slot in a slot $SLOT_{RACH}$ for a RACH when BC is valid.

1) The case in which one mini slot is defined for a slot to which the RACH resource is allocated:

FIG. 11 illustrates a method of configuring a mini slot within a RACH slot $SLOT_{RACH}$ when BC holds.

The UE is aware of all information about RACH resources that the gNB uses through system information. Therefore, a set of minimum OFDM symbols including a whole RACH resource allocated per SS block may be defined as one mini slot. When the gNB performs scheduling at a time to which the RACH resource is allocated, the UE interprets the mini slot as a TTI and transmits the data or control channel in the TTI. If multiple mini slots are included in one normal slot, the UE needs to determine through which mini slot the UE is to transmit the data/control channel. A method for the UE to determine a mini slot to be used to transmit the data/control channel may broadly include the following two schemes.

A. If the gNB schedules transmission of a UL data/control channel, the gNB may designate, for the UE, which mini slot within a slot the UE should use for transmission, through DCI.

B. The UE continuously performs beam tracking in a multi-beam scenario. If the UE previously receives, from the gNB, information about an SS block to which a serving beam from which the UE currently receives a service is connected, the UE interprets the same time region as a time region to which the RACH resource connected to the SS block associated with the serving beam is allocated as a time region in which the UE should perform transmission. If the RACH resource connected to the SS block associated with the serving beam of the UE is not present in a slot scheduled for the UE, the UE may determine that beam mismatch has occurred.

Figure 12:
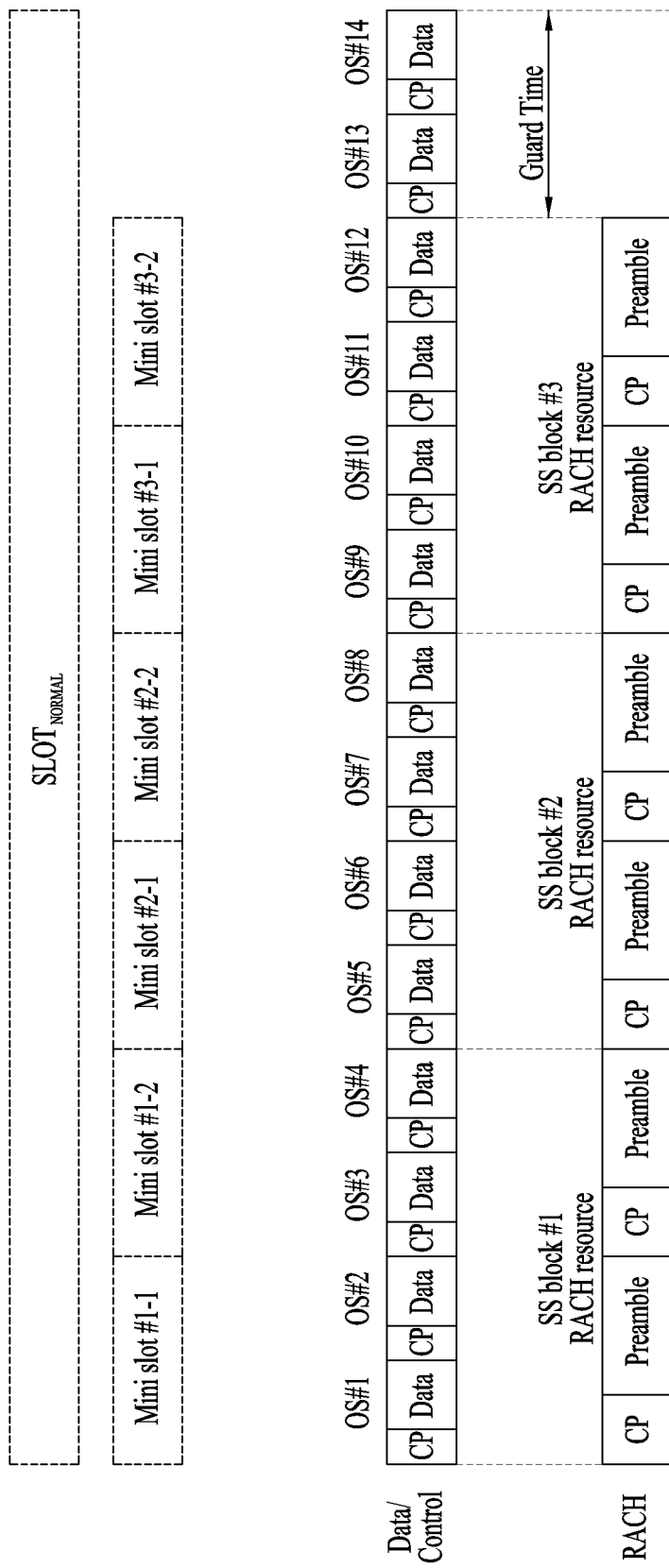
FIG. 12 illustrates another method of configuring a mini slot in a slot $SLOT_{RACH}$ for a RACH when BC is valid.

2) The case in which multiple mini slots are defined in a slot to which the RACH resource is allocated:

FIG. 12 illustrates another method of configuring a mini slot within a RACH slot $SLOT_{RACH}$ when BC holds.

When multiple mini slots are defined in a slot to which a RACH resource is allocated, this is basically similar to the case in which multiple mini slots are defined in a slot to which a RACH resource is allocated except that multiple mini slots are present in a slot to which one RACH resource is allocated. The same operation as the method proposed in FIG. 11 is performed. However, as illustrated in FIG. 12, a set of minimum OFDM symbols including a whole RACH resource is divided into a few subsets and each subset is defined as a mini slot. In this case, the gNB should first inform the UE of how the set of minimum OFDM symbols including a RACH resource should be divided to use the mini slots. For example, the gNB may indicate, in a bitmap form, how the minimum OFDM symbols including the RACH resource are divided to the UE. Alternatively, when the minimum OFDM symbols including the RACH resource can be divided into a plurality of equal subsets, the gNB may inform the UE of the number of allocated mini slots. In addition, the gNB should indicate, to the scheduled UE, through which mini slot among the multiple mini slots the UE should transmit the data/control channel. The gNB may directly indicate a mini slot through which the data/control channel should be transmitted through the DCI. Alternatively, when the UE is scheduled in a time region to which the RACH resource is allocated, the gNB may inform the UE of a mini slot to be used, in advance (e.g., during connection setup). Alternatively, it is possible to determine a mini slot to be used by a predetermined rule using information, such as a UE ID, which is shared between the UE and the gNB.

Figure 13:
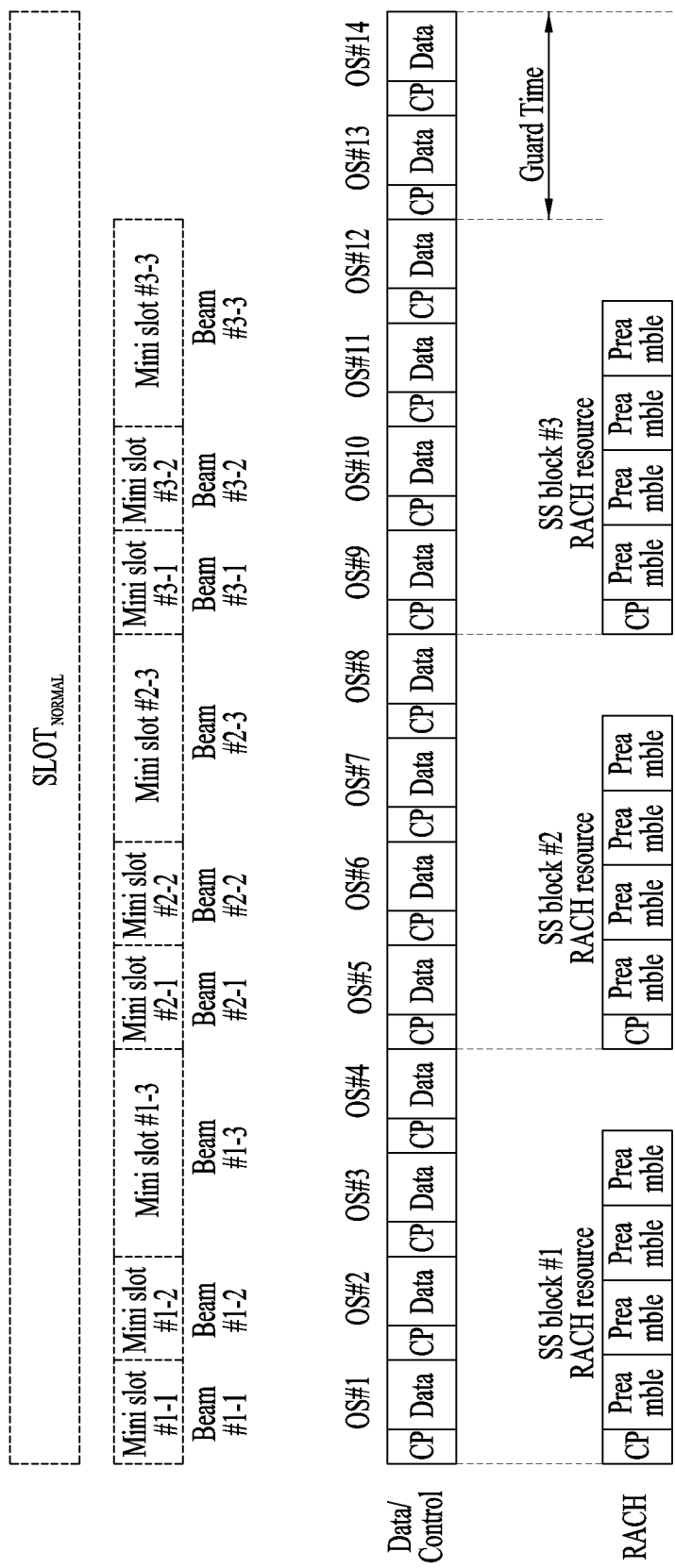
FIG. 13 illustrates a method of configuring a mini slot in a slot $SLOT_{RACH}$ for a RACH when BC is not valid.

3) The Case in which BC does not Hold and, Thus, Beam Scanning is Performed During Preamble Repetition:

FIG. 13 illustrates a method of configuring a mini slot within a RACH slot $SLOT_{RACH}$ when BC does not hold.

When BC does not hold, the gNB performs beam scanning while sweeping beam directions of a receiver in a slot to which one RACH resource is allocated, as described above. Therefore, this case may operate similarly to a scheme in which BC holds and multiple mini slots are present in a slot to which the RACH resource is allocated. To this end, similarly to the method described in FIG. 12, the gNB transmits, to the UE, information as to how beam scanning will be performed with respect to a set of minimum OFDM symbols including the RACH resource and information as to which SS block each beam is connected. This information may be used as information about which mini slot can be scheduled for the UE. In this case, similarly to the method described in FIG. 12, the UE may receive, through the DCI, the information about which mini slot among the multiple mini slots which can be scheduled for the UE is scheduled to transmit the data/control channel. Alternatively, the information may be prescheduled through an RRC signal or may be defined by a predefined rule using information shared between the gNB and the UE.

4) The Case of Grant-Free Scheduling:

A. When a time resource of a data/control channel transmitted by the UE on a grant-free resource overlaps a RACH resource, the data/control channel may be transmitted in a mini slot defined in a time region of the RACH resource. However, when grant-free scheduling is used and a signal format of the data/control channel that the UE is to transmit through the grant-free scheduling, i.e., through a grant-free resource, is a normal slot or a slot which is shorter than the normal slot but is longer than the mini slot defined in a RACH resource region and when the length of the mini slot is too short, so that a code rate of transmission of the data/control channel through the mini slot is too high relative to a designate code rate, the UE may i) drop transmission, ii) change a transport block size, or iii) transmit the data/control channel using multiple mini slots when the multiple mini slots are available. On the other hand, when the code rate of transmission of the data/control channel is lower than the designated code rate even if the data/control channel is transmitted with the length of the mini slot, the UE may transmit the data/control channel with a designated transport block size.

>B. When grant-free scheduling is used and the signal format of the data/control channel that the UE is to transmit through the grant-free scheduling, i.e., through the grant-free resource, is shorter than the mini slot, the data/control channel may be normally transmitted at a mini slot location determined in the above-mentioned scheme. That is, if the data/control channel through grant-free scheduling requires a resource of a shorter length than the mini slot in the time domain, the UE transmits the data/control channel through a mini slot corresponding to the same gNB Rx beam as the data/control channel among mini slots configured to match the length of the RACH resource (i.e., RACH preamble). In this case, the transport block size may increase according to a predetermined rule in proportion to a mini slot length compared with a preconfigured signal format. For example, if the signal format in which the data/control channel is transmitted through grant-free scheduling is defined as using two OFDM symbols and the mini slot length in a RACH slot corresponds to three OFDM symbols, the transport block size capable of carrying the data/control channel of grant-free scheduling may increase by 1.5 times.

Figure 14:
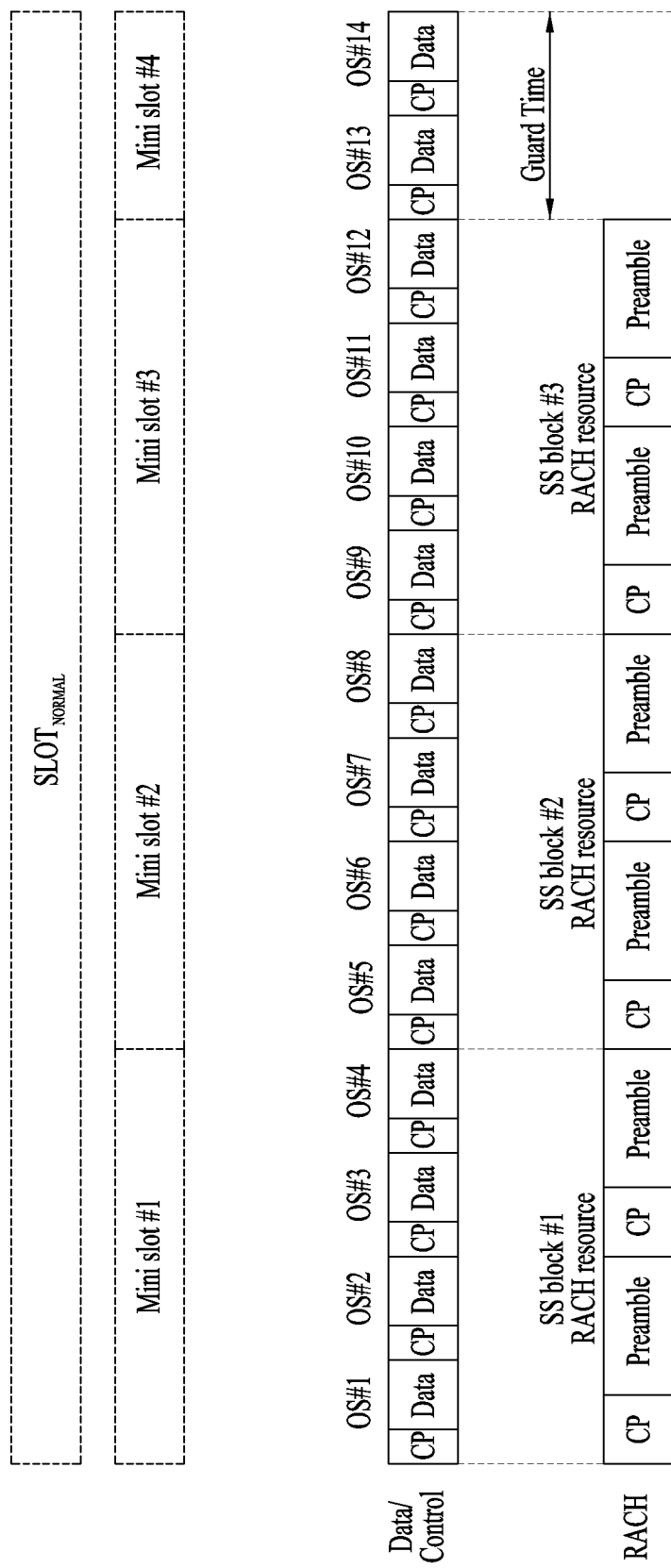
FIG. 14 illustrates a method of configuring a mini slot using a guard time.

5) Allocation of Mini Slot to Guard Time or Blank Duration:

FIG. 14 illustrates a method of configuring a mini slot using a guard time.

The gNB may freely configure an Rx beam with respect to a part of a duration configured as the guard time, or a blank duration in a slot remaining after configuring a RACH resource in one slot even though the blank duration is not for usage of the guard time. Accordingly, the gNB may inform the UE of information about a mini slot capable of being used independently of a beam for RACH resource reception together with information related to the RACH resource and the UE may expect that dynamic scheduling will be performed with respect to the mini slot configured in the guard time. The location(s) of allocated mini slot(s) may be determined by the above-described methods (e.g., methods of indicating the length and locations of mini slots configured in a RACH slot and a beam direction).

6) Allocation of Short PUCCH Resource:

In a TDD system, a control channel may be transmitted during a partial duration of one slot by configuring the control channel with a short length. In an NR system, schemes in which a DL control channel is transmitted in a front part of one slot and a UL control channel is transmitted in the last part of one slot are under discussion. Particularly, the UL control channel transmitted in this way is referred to as a short PUCHH. Since the short PUCCH is configured to be transmitted on the last one or two symbols, the short PUCCH may be transmitted in the above-described mini slot. However, as mentioned previously, since a beam direction may vary within one slot, the short PUCCH cannot always be located at the last part of the slot. Accordingly, when the short PUCCH is scheduled in a slot region to which a RACH resource is allocated, the UE transmits the short PUCCH in a mini slot in which a beam in the same direction as a beam from which the UE receives a service (i.e., a gNB Rx beam, or a UE Tx beam corresponding to the gNB Rx beam) or a beam in which the gNB previously forms a link for the short PUCCH (i.e., a gNB Rx beam, or a UE Tx beam corresponding to the gNB Rx beam) is present. In this case, the PUCCH may be transmitted at the last symbol location in the mini slot, a symbol location designated by the gNB through signaling, or a symbol location determined by a rule. However, the UE may drop transmission of the short PUCCH when the beam in the same direction as a beam from which the UE receives a service or the beam in which the gNB previously forms a link for the short PUCCH is not present.

Mini Slot Concatenation

In the procedure of forming the Rx beam for the RACH resource set, if Rx beam directions of respective RACH resources are not greatly different, the data or control channel may be transmitted through a long slot for performing transmission throughout a duration of the RACH resource set. This may be referred to as mini slot concatenation in which the above-described mini slots are used through concatenation as described above.

Figure 15:
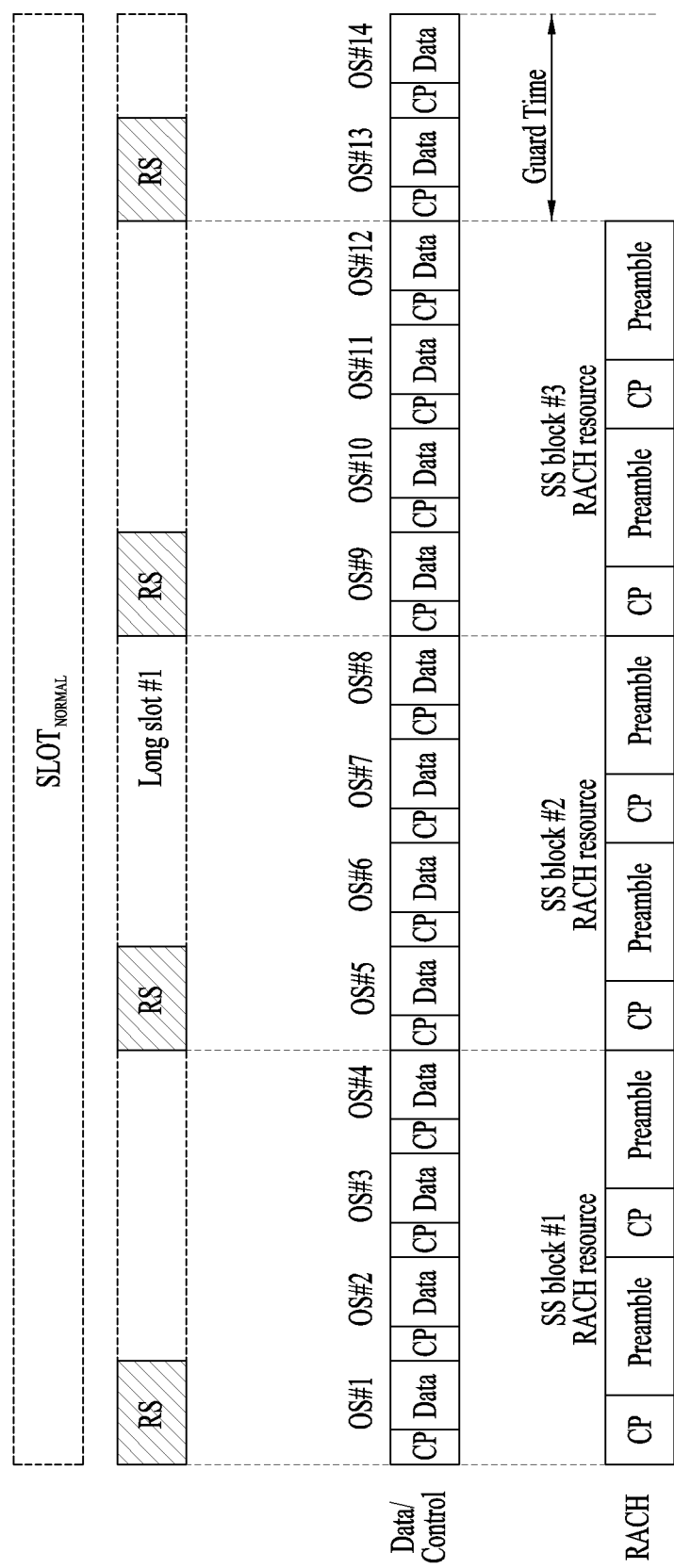
FIG. 15 illustrates an example of concatenating mini slots in the same length as a normal slot with a valid BC to transmit data.

FIG. 15 illustrates an example of transmitting data by performing mini slot concatenation with the same length as a normal slot when BC holds. Particularly, FIG. 15 illustrates transmission of concatenated mini slots and insertion of a reference signal during a RACH resource duration when BC holds. For example, one data packet may be transmitted throughout a long slot obtained by concatenating mini slots so that the long slot may have the same length as a normal slot. In this case, one data packet is dividedly transmitted in mini slots within the long slot.

Thus, in the case of data transmission using the concatenated mini slots, since the gNB forms an Rx beam of each RACH resource using information about an SS block transmission direction, the UE desirably transmits a signal in a direction capable of receiving each SS block with the best quality. Therefore, the gNB informs the UE of information related to Rx beam formation (e.g., information associated with the SS block) with respect to each OFDM symbol (when BC does not hold) or with respect to each RACH resource (when BC holds) in a RACH resource time region. In this case, smooth reception of the data channel may not be performed because the Rx beam of the gNB is changed during signal transmission while the UE performs signal transmission through concatenated mini slots and transmits a reference signal in a format defined for a normal slot. Therefore, it is necessary to insert the reference signal in a unit in which the Rx beam direction of the gNB varies in consideration of variation in the Rx beam direction of the gNB. To this end, a reference signal structure for the concatenated mini slots allocated in a RACH resource duration may be desirably defined. The UE to which the data or control channel of a concatenated mini slot format is allocated in the RACH resource duration should transmit the reference signal of the concatenated mini slot format.

During transmission of a PUSCH or a PUCCH, if one stable gNB Rx beam for a UE Tx beam direction of the PUSCH or the PUCCH is not present or a plurality of beams has similar quality, the PUSCH or a long PUCCH may be stably received by transmitting the PUSCH or the PUCCH through concatenated mini slots so as to use a beam diversity characteristic. In this case, the gNB may efficiently use a time resource to which a RACH resource is allocated by transmitting the PUSCH or the PUCCH in a RACH resource region.

Additionally, the gNB performs beam tracking for a Tx beam or an Rx beam so that a beam having the best quality is maintained as a serving beam in order to stably maintain a service in a multi-beam environment. Accordingly, the gNB may measure quality of the gNB Rx beam or the UE Tx beam and perform beam tracking by causing the UE to perform repetitive transmission of the PUSCH, the long PUCCH, or a short PUCCH in each RACH resource region or transmit an RS defined for beam tracking through a plurality of mini slots, using a characteristic in which the gNB changes the Rx beam in a slot duration to which the RACH resource is allocated. That is, for efficient use of a resource for beam tracking, the gNB may cause the UE to transmit a physical channel suitable for a characteristic for a time region to which the RACH resource is allocated and the gNB may use the physical channel as a resource for beam tracking. In other words, for efficient use of the resource for beam tracking, the gNB may indicate, to the UE, that the UE should transmit the physical channel through a UE Tx beam suitable for each of mini slot(s) configured in the time region to which the RACH resource is allocated and the gNB may use the physical channel in each mini slot for beam tracking. In order for the UE to efficiently transmit a signal for beam tracking, the gNB informs the UE of information about change in a beam direction as described above and the UE inserts a reference signal into each Rx beam of the gNB according to this information and a predefined rule and transmits the reference signal. The gNB may use the reference signal as a signal for channel estimation for an Rx beam duration or a signal for signal quality measurement for beam tracking.

Upon transmitting the PUSCH or the long PUCCH which is received in the gNB through beam diversity, since the gNB attempts to receive a signal in each Rx beam duration, antenna gain may have a different characteristic. Therefore, the UE may differently configure transmission power of the PUSCH/PUCCH with respect to each Rx beam direction (e.g., each RACH resource region). To this end, the gNB may inform the UE that reference channel/signal information and a power control parameter, for pathloss calculation used for open loop power control, should be separately configured with respect to each RACH resource region. The UE configures and transmits different transmission powers in a RACH resource time region using this information.

Unlike this, during transmission of a signal for beam tracking (or beam management) in a plurality of RACH resource regions, the respective RACH resource regions should maintain the same transmission power in order for a gNB to measure quality of a signal received by the gNB. In this case, only one reference channel/signal is needed for control of one power. If the gNB informs the UE of information about the reference channel/signal or the information is predefined by a rule, the UE may determine the magnitude of transmission power using the reference channel/signal and transmit the PUSCH/PUCCH by equally applying the transmission power to all regions.

The gNB may inform the UE of whether UL data or the control channel transmitted in a RACH resource transmission time region, i.e., a time region to which the RACH resource is configured in a corresponding cell, is used for beam diversity or for beam tracking with respect to each UL channel and cause the UE to perform a power control operation according to the above usage.

<PRACH Configuration>

PRACH configuration includes time/frequency information of a RACH resource and may be included in the remaining minimum system information (RMSI). The RMSI may be interpreted as a system information block 1 (SIB1) and represents system information that the UE should acquire after receiving a master system information block (MIB) through a physical broadcast channel (PBCH). Upon receiving the PRACH configuration information, the UE is able to transmit PRACH message 1 (Msg1) on a designated time and frequency resource using one preamble in a preamble set included in the PRACH configuration. A preamble format in the PRACH configuration information may also provide CP length, number of repetitions, subcarrier spacing, sequence length, etc. Hereinafter, details on the PRACH configuration will be described.

1. Time and Frequency Locations of RACH Resources

For signaling RACH resource time domain information, the RACH resource time domain information may include information about reserved RACH resources and RACH slot information about an accurate RACH resource location in a slot. Here, the RACH slot information may vary according to a PRACH preamble subcarrier spacing. That is, a UE may determine slot indices in a radio frame on the basis of RACH preamble subcarrier spacing configuration information. For example, a radio frame includes 10 slots in the case of a subcarrier spacing of 15 kHz and includes 40 slots in the case of a subcarrier spacing of 60 kHz.

Although RACH slot configuration information configured per window of 10 ms or more may be represented through a bitmap or a compressed bitmap, 80 slots are included per radio frame in the case of a subcarrier spacing of 120 kHz and thus bitmap signaling of a RACH slot causes significant signaling overhead. In addition, a RACH slot needs to be differently configured according to periodicity and a RACH slot frequency within a predetermined duration. Accordingly, it is necessary to provide different pieces of RACH slot configuration information according to RACH preamble subcarrier spacing in order to reduce signaling overhead. That is, M states need to be specified per subcarrier spacing for a RACH preamble, and each state has a RACH slot frequency and/or periodicity within a different predetermined duration. For example, one state may be reserved for a RACH slot having a periodicity of 10 ms in the latter half of a radio frame.

Figure 16:
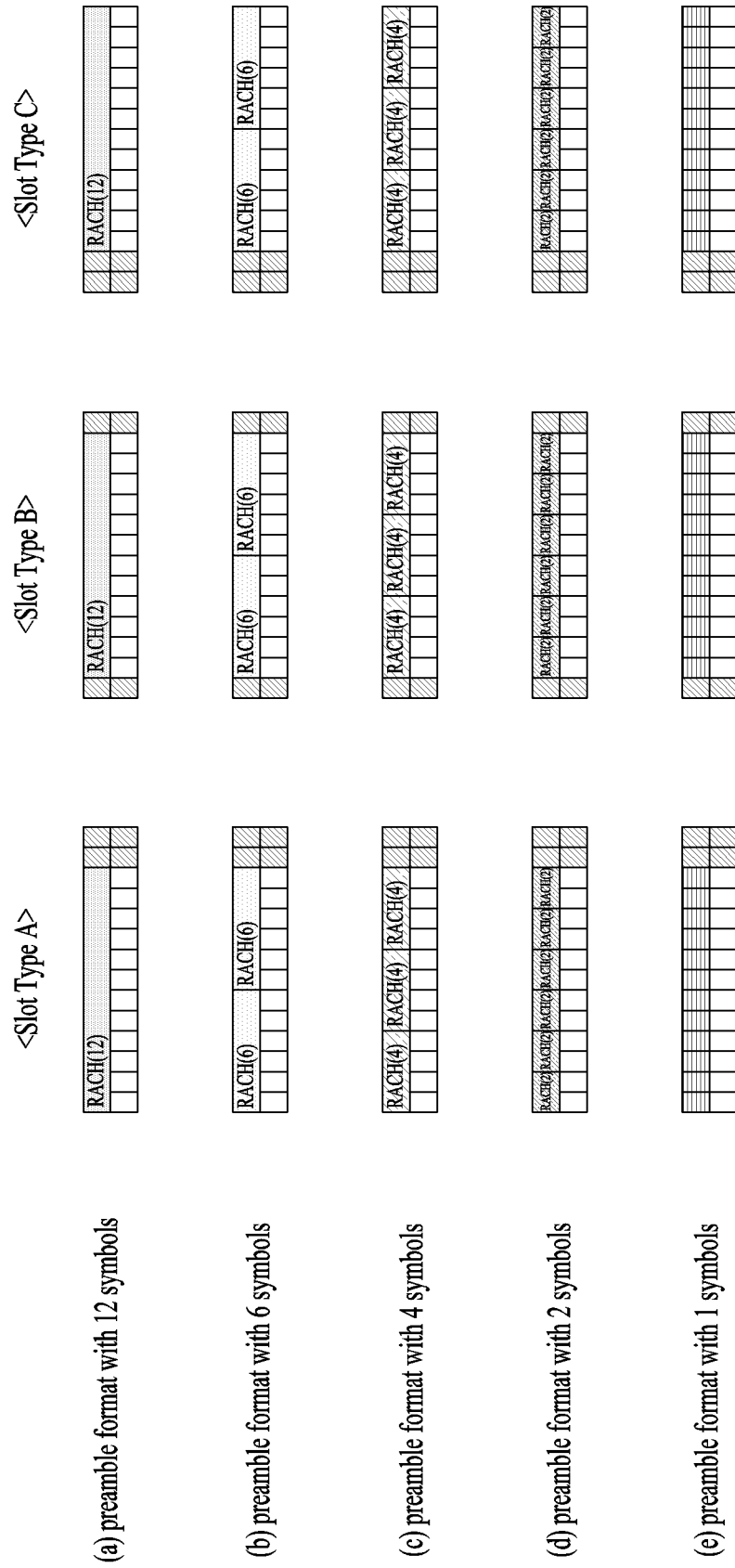
FIG. 16 illustrates examples of RACH slot types.

When correct information about RACH slots is provided, RACH resources in each RACH slot may be acquired on the basis of a combination of a RACH preamble format and a subcarrier spacing of PRACH Msg. 1. In addition, to indicate a correct RACH resource location in a slot, a network signals a start symbol index of a RACH resource, as illustrated in FIG. 16. Although a start symbol index of a RACH resource in a RACH slot may be signaled per RACH slot, it is more desirable to apply the start symbol index to all RACH slots in order to reduce signaling overhead.

An SS block is composed of 4 symbols of a PSS, an SSS and a PBCH (2 symbols), and one slot is composed of 14 symbols and disposed in one slot. Synchronization procedures included in 3GPP TS 38.213 draft define symbols at which an SS block composed of PSS/SSS/PBSS can be positioned within a slot according to subcarrier spacing as shown in

TABLE 8

4 Synchronization procedures
4.1 Cell search
Cell search is the procedure by which a UE acquires time and frequency synchronization with a cell and detects the physical layer Cell ID of that cell.
A UE receives the following synchronization signals (SS) in order to perform cell search: the primary synchronization signal (PSS) and secondary synchronization signal (SSS) as defined in [4, TS 38.211].

TABLE 8-continued

A UE shall assume that reception occasions of a physical broadcast channel (PBCH), PSS,
and SSS are in consecutive OFDM symbols, as defined in [4, TS 38.211], and form a
SS/PBCH block.
For a half frame with SS/PBCH blocks, the number and first OFDM symbol indexes for
candidate SS/PBCH blocks are as follows.
15 kHz subcarrier spacing: the first OFDM symbols of the candidate SS/PBCH blocks
have indexes of {2, 8} + 14 * n.
For carrier frequencies less than or equal to 3 GHz, n = 0, 1. For carrier frequencies greater
than 3 GHz and less than or equal to 6 GHz, n = 0, 1, 2, 3.
30 kHz subcarrier spacing: the first OFDM symbols of the candidate SS/PBCH blocks
have indexes {4, 8, 16, 20} + 28 * n. For carrier frequencies less than or equal to 3 GHz, n = 0.
For carrier frequencies greater than 3 GHz and less than or equal to 6 GHz, n = 0, 1.
30 kHz subcarrier spacing: the first OFDM symbols of the candidate SS/PBCH blocks
have indexes {2, 8} + 14 * n. For carrier frequencies less than or equal to 3 GHz, n = 0, 1. For
carrier frequencies greater than 3 GHz and less than or equal to 6 GHz, n = 0, 1, 2, 3.
120 kHz subcarrier spacing: the first OFDM symbols of the candidate SS/PBCH blocks
have indexes{4, 8, 16, 20} + 28 * n. For carrier frequencies greater than 6 GHz, n = 0, 1, 2, 3, 5,
6, 7, 8, 10, 11, 12, 13, 15, 16, 17, 18.
240 kHz subcarrier spacing: the first OFDM symbols of the candidate SS/PBCH blocks
have indexes {8, 12, 16, 20, 32, 36, 40, 44} + 56 * n. For carrier frequencies greater than 6
GHz, n = 0, 1, 2, 3, 5, 6, 7, 8.
The candidate SS/PBCH blocks in a half frame are indexed in an ascending order in time
from 0 to L – 1. For L = 4 or for L > 4, a UE shall respectively determine the 2 or 3 LSB bits
of a SS/PBCH block index per [half frame] from one-to-one mapping with an index of the
DMRS sequence transmitted in the PBCH. For L = 64, the UE shall determine the 3 MSB bits
of the SS/PBCH block index per [half frame] from higher layer parameter [SSB-index-
explicit].
A UE can be configured by parameter [SSB-transmitted-SIB1], indexes of SS/PBCH
blocks for which the UE shall not receive other signals or channels in REs that overlap with
REs corresponding to the SS/PBCH blocks. A UE can also be configured [per serving cell],
by higher layer parameter [SSB-transmitted], indexes of SS/PBCH blocks for which the UE
shall not receive other signals or channels in REs that overlap with REs corresponding to the
SS/PBCH blocks. [A configuration by [SSB-transmitted] overrides a configuration by [SSB-
transmitted-SIB 1]]. A UE can be configured per serving cell by [higher layer parameter]
[SSB-timing] a periodicity of the half frames for receptions of SS/PBCH blocks per serving
cell. If the UE is not configured a periodicity of the half frames for reception of SS/PBCH
blocks, the UE shall assume a periodicity of a half frame. A UE shall assume that the
periodicity is the same for all SS/PBCH blocks in the serving cell.
For initial cell selection, a UE may assume that half frames with SS/PBCH blocks occur
with a periodicity of 2 frames.

Slots in which SS blocks can be positioned and whether the SS blocks are transmitted in the slots are signaled to UEs through network signaling. Accordingly, a slot which can be used to transmit an SS block but is not actually used for SS block transmission may be used for a RACH transmission slot.

Since the network provides RACH slot information and information about actually transmitted SS blocks, a UE needs to determine whether some or all of slots configured as RACH slots are occupied by SS blocks on the basis of such information. If a RACH slot is completely occupied by SS blocks, this RACH slot cannot be used for RACH preamble transmission. Here, complete occupation by SS blocks means that the length of consecutive symbols which are not occupied by SS blocks in the slot is shorter than the length of the RACH preamble format.

If a RACH slot is partially occupied by SS blocks, the RACH slot may be used for RACH preamble transmission. Here, partial occupation of the RACH slot means that the length of consecutive unoccupied symbols within the slot is equal to or longer than the length of OFDM symbols occupied by a RACH preamble format indicated by the network. Here, the UE calculates symbols which are not used for SS block transmission on the basis of information on actually transmitted SS blocks and determines the number of RACH resources which can be used for PRACH transmission among symbols other than symbols occupied by SS blocks in the slot on the basis of the RACH preamble format. Here, symbols which can be used for PRACH transmission are determined according to the RACH preamble format and a RACH resource start position in the slot is determined by the RACH preamble format and RACH slot type, as shown in FIG. 16.

Frequency locations of RACH resources are signaled with respect to an uplink initial bandwidth part (BWP) in a BWP and resource allocation for RACH transmission.

When the above description is summarized, time/frequency information about RACH resources may include the following.

RACH slot position information patterns having different RACH slot frequencies and/or periodicities for subcarrier spacings for RACH preamble (Msg. 1) may be defined as M states, and a specific state having the RACH preamble subcarrier spacing and RACH slot frequency and/or periodicity used in the corresponding system may be indicated as PRACH configuration information to inform UEs of RACH slot position information.

A RACH resource start symbol index in a RACH slot is signaled. Here, the start symbol index may be an OFDM symbol number such as {0, 1, 2}. Further, the RACH slot type is applied to all RACH slots.

A RACH resource frequency location may be determined by an uplink initial BWP in a BWP and resource allocation for RACH transmission.

2. RACH Resource Configuration in Time Domain

RACH resource configuration in the time domain will be described with reference to FIGS. 17 and 18. Here, RACH resources refer to time/frequency resources in which PRACH Msg. 1 can be transmitted. RACH preamble index configuration in RACH resources is described. RACH resources are associated with SS blocks in order to identify a preferred downlink transmission beam direction. That is, each RACH resource in the time domain is associated with an SS block index.

In addition, a RACH resource set in the time domain may be defined with respect to default periodicity of SS blocks in a cell. A plurality of RACH resources associated with one SS block may be within the RACH resource set in the time domain. Referring to FIG. 17, an SS block period and a RACH resource set period may be set, as illustrated in FIG. 17. The RACH resource set period may be determined on the basis of the SS block period and a plurality of RACH resources may be configured within the RACH resource set period.

Figure 17:
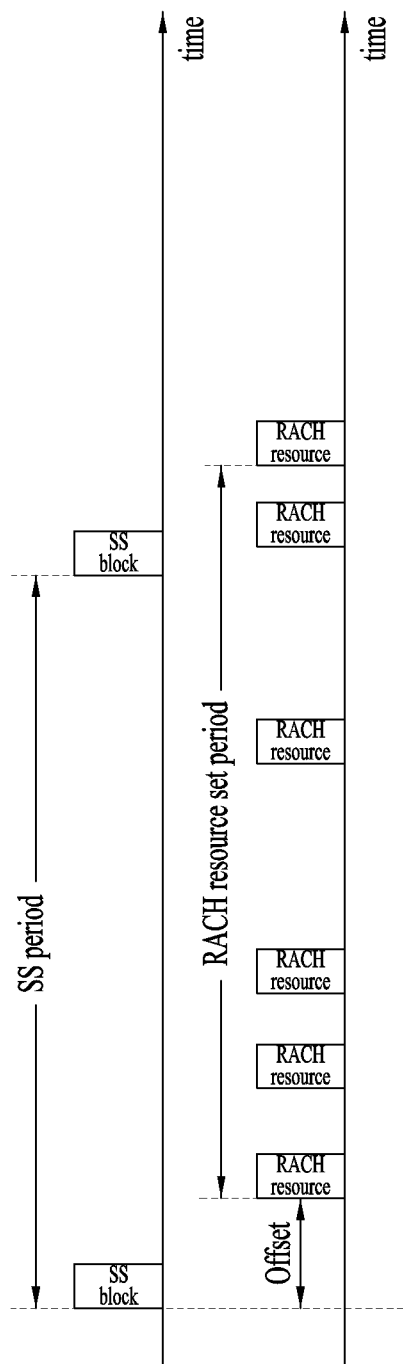

In FIG. 17, each time instance to which a RACH resource is allocated is called a RACH occasion. That is, when only the time domain and frequency domain are considered without the sequence domain, one RACH resource can be called one RACH occasion. If the RACH resource set period is determined on the basis of the SS block period, a correct timing instance may be indicated as an offset from a transmission timing of an SS block associated with the corresponding RACH resource. Correct positions of RACH occasions in the RACH resource set are also provided to UEs.

Figure 18:
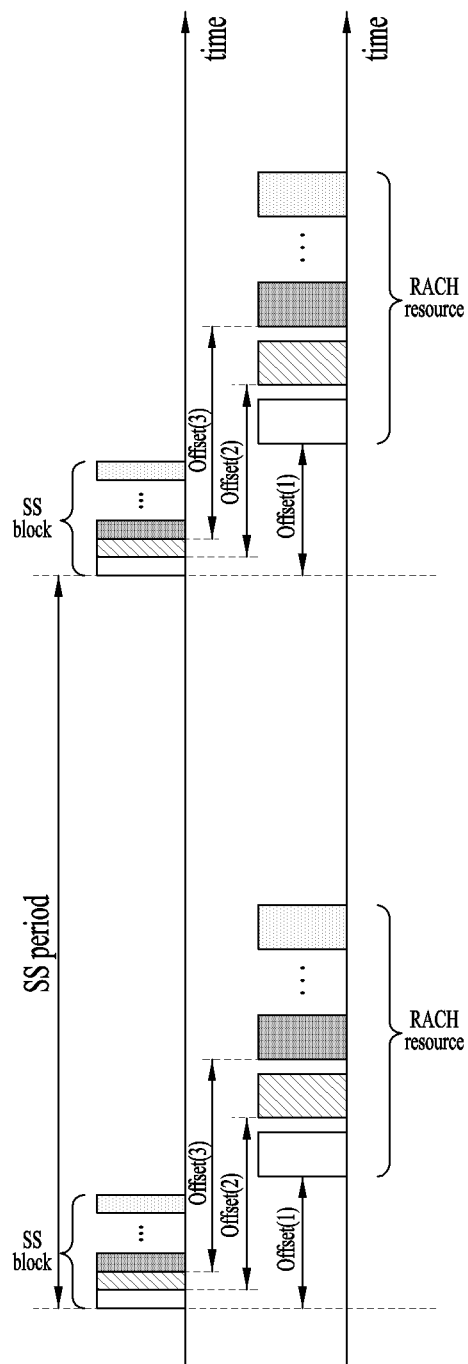

FIG. 18 illustrates a method of indicating association between an SS block and a RACH resource. Each RACH resource set is configured using an SS block period. A correct RACH resource start position in the time domain may depend on a RACH resource set corresponding to an SS block, and thus a timing offset from each SS block to a RACH resource set corresponding thereto may be signaled.

A RACH resource duration is determined by a PRACH preamble format. The length of a RACH preamble including a guard time (e.g., preamble format) is set according to cell coverage. In addition, the number of repetitions of the preamble determines the RACH resource duration. Accordingly, RACH resource configuration includes the number of repetitions of a RACH sequence for preamble length indication in addition to the RACH preamble format for a CP length.

As described above, the initial downlink beam acquisition procedure in an NR system using multiple beams is preferentially performed through detection of an SS block having highest reception quality. Accordingly, information about a downlink beam that a UE prefers is signaled to a base station through an initial RACH procedure. Therefore, information about a beam index corresponding to an SS block detected by the UE may be indirectly signaled through the location of a resource for RACH preamble transmission in the NR system. For example, a RACH resource is linked to each SS block, as described above with reference to FIG. 5, and the UE signals information about a beam index in the form of a RACH resource linked to each SS block to the base station. That is, the UE can signal a preferred downlink beam, that is, an SS block, to the base station by transmitting a PRACH using a RACH resource associated with an SS block detected thereby.

Since time/frequency resources of RACH resources are basically linked to SS blocks, it is desirable to allocate RACH resources on the basis of a default SS block transmission period used in an initial access stage. However, when a small number of UEs is located in the cell of the base station, RACH resources may be allocated intermittently compared to the default transmission period. Accordingly, the present invention proposes a method of defining a slot to which a RACH resource is allocated as a RACH slot and allocating a RACH slot period to a multiple of a default SS block transmission period. Although the above description is based on a multi-beam environment, it may be efficient to allocate RACH resources in the same manner in order to maintain the same structure in a single-beam environment. Information about RACH time resources among RACH resource allocation information transmitted from a network/gNB to a UE may include the following.

1) An associated SS block index
2) Location of a RACH slot from an SS block
3) A RACH slot period represented as a multiple or a function of an SS block period
4) An offset value for signaling a correct location without ambiguity when a RACH slot period with respect to an SS block period is greater than 1. Here, the offset value is set on the basis of subframe number 0.

When time/frequency resources to which RACH resources are allocated are associated with SS blocks as described above, the number of RACH resources through which a UE can transmit a RACH may be the same as the number of SS blocks. Although a RACH resource generally includes all of time, frequency and code domain resources capable of carrying a RACH preamble, the RACH resource is used as time/frequency resource blocks capable of carrying the RACH preamble in the present invention for convenience of description. However, a RACH resource mentioned along with a preamble sequence may also be used as a resource including a sequence domain, that is, a code domain. For example, when RACH resources are represented as sharing the same time/frequency resource, the RACH resources are one RACH resource from the viewpoint of time/frequency resources but they may correspond to a plurality of RACH resources when the sequence domain is considered.

However, in an environment in which a small number of UEs exist in a base station, it may be inefficient for different RACH resources to be allocated to SS blocks. Accordingly, if the base station can receive RACH preambles using the same reception beam or simultaneously receive RACH preambles through a plurality of beams, the same time/frequency resource may be allocated to RACH resources linked to a plurality of SS blocks. That is, a plurality of SS blocks may be associated with a single RACH time-frequency resource. In this case, the SS blocks with respect to the RACH resource may be identified by preamble indices or preamble index sets used in the RACH resource. That is, the number of RACH resources may be allocated to be equal to or less than the number of SS blocks.

The base station determines a time/frequency region to which a RACH resource will be allocated and signals information about the same to a UE through system information. In the case of LTE, one or two subframes constitute a RACH slot according to preamble format and thus a UE can be aware of the location of a RACH resource in the time domain when the base station designates a specific subframe location through PRACH configuration information. On the contrary, the NR system requires information in a different form from the above-described information according to configuration and environment of the base station. Particularly, the RACH preamble is configured in such a manner that a default sequence having a short length is defined due to robustness against a high Doppler frequency, Rx beam scanning and design conforming to TDD/FDD and the default sequence is repeated to secure beam scanning and coverage in the NR system, and thus RACH time resource locations may be considerably variable according to the base station or environment. In addition, the NR system may be composed of a large number of small cells having a very small size. In this case, the RACH preamble length may become very short and a RACH slot in which a plurality of RACH preambles can be transmitted may be configured in the time domain. For example, RACH time resource information may be provided to UEs as illustrated in FIG. 18.

FIG. 19 illustrates RACH time resource information. Information about time resources of RACH resources, that is, PRACH time resource information may include the following information:

1) The relative position of a RACH resource/slot with respect to an SS block position or a position of a RACH slot with respect to SS period;

2) The position of an OFDM symbol at which a RACH resource starts in a RACH slot;

3) A preamble format (i.e., CP length, sequence length) with respect to a RACH resource and the number of repetitions of a sequence; and/or 4) Information about the number of RACH resources defined as above which will be allocated on the time axis. Information corresponding to the position of each RACH resource, for example, a relative position or an absolute position of each RACH resource when multiple RACH resources are allocated and are not consecutive on the time axis.

Even when RACH resources connected to a plurality of SS blocks share the same time/frequency resource, a UE needs to identify a RACH resource linked to an SS block with respect to the same time/frequency resource and transmit a RACH preamble in order to transmit beam acquisition information to the base station. To this end, preamble sequences available in one RACH resource need to be allocated for SS blocks. Preamble sequences in the LTE and NR systems are composed of combinations of a root sequence which determines a default sequence, sequences of cyclic shift versions having zero-correlation characteristic in each root sequence and an orthogonal cover sequence. Here, a plurality of root sequences may be allocated to secure a large number of preamble sequences within a RACH resource in order to improve resource efficiency. In general, cross correlation between root sequences is larger than cross correction between sequences having different cyclic shift versions or different orthogonal cover sequences. In addition, a signal received through a beam different from a beam suitable for a UE is weak due to beam characteristics, and thus cross correlation between corresponding sequences does not significantly affect RACH reception performance in beam directions different from the beam direction for the UE even if the cross correlation is large. Accordingly, when multiple RACH resources share the same time/frequency resource, it is desirable that each RACH resource be composed of preamble sequences having as small cross correlation as possible. If RACH preamble sequences are composed of a combination of a root sequence and sequences of different cyclic shift versions or orthogonal cover sequences in the root sequence, as in the above-described embodiment, preamble sequences having different cyclic shift versions in the same root sequence or preamble sequences having different orthogonal cover sequences in the same root sequence may be preferentially allocated to RACH resources linked to one SS block and then different root sequence indices may be allocated. For example, preamble sequences may be allocated to RACH time/frequency resources as illustrated in FIG. 19.

FIG. 20 illustrates a RACH preamble sequence allocation example.

Referring to FIG. 20, {15, 27, 127, 138} are allocated as root sequences for one time/frequency resource, and an orthogonal cover {0, 1} and a cyclic shift version {0, 1, 2, 3} are allocated to each root sequence. Here, when two RACH resources are allocated to the time/frequency resource, a ZC index composed of an OCC index and a cyclic shift version is preferentially allocated to a RACH resource linked to an N-th SS block and a RACH preamble sequence set composed of two root sequences {15, 27} is allocated. A RACH preamble sequence set is allocated to a RACH resource linked to an (N+1)-th SS block in the same order. To signal RACH resources to a UE, the base station signals information for configuring a RACH preamble sequence set per RACH resource and determines the order of RACH preamble sequences in a RACH preamble sequence set according to a predefined rule. Here, the predefined rule preferentially increases the RACH preamble sequence index for {OCC index, cyclic shift version} and then increases the next RACH preamble sequence index on the basis of the root sequence index. That is, the RACH preamble sequence index preferentially increases in ascending order of cross correlation between sequences.

3. RACH Resource Configuration in Frequency Domain

PRACH configuration may provide information about the frequency region of a RACH resource. When a UE attempts PRACH transmission in a situation in which the UE is not connected to a cell, the UE may not recognize the system bandwidth or resource block indexing.

In LTE, a synchronization signal is transmitted at the center of the system bandwidth and a PBCH provides the system bandwidth, and thus a UE can easily acquire the correct position of a RACH resource. However, transmission of a synchronization signal at the center of the system bandwidth is not secured in the NR system. Accordingly, a UE may not easily acquire resource block indexing for PRACH transmission in the NR system. Therefore, a method of providing a RACH resource position in the frequency domain is required.

Since UEs in an idle mode acquire frequency synchronization on the basis of SS blocks, it is desirable to provide information about a frequency location of a RACH resource with respect to an SS block bandwidth. That is, a RACH resource in the frequency domain needs to be positioned within an SS block bandwidth in which a UE detects an SS block. A RACH preamble transmission bandwidth has a fixed value in a default subcarrier spacing of 15 kHz of a PSS/SSS/PBCH. For example, the RACH preamble transmission bandwidth may be fixed to 1.08 MHz in the default subcarrier spacing of 15 kHz. When the RACH preamble transmission bandwidth is 1.08 MHz, the SS block transmission bandwidth on the assumption of the 15 kHz subcarrier spacing is quadruple of the RACH transmission bandwidth. The network needs to provide a correct RACH resource position in the frequency domain in an SS block.

1 If the network configures a RACH resource outside an SS block in which a PSS/SSS/PBCH is transmitted, information about the RACH resource needs to be signaled on the basis of the bandwidth of the SS block and the bandwidth of the RACH. Here, the system bandwidth is indexed in units of an SS block bandwidth.

4. Number of Resources in Time Region

A short ZC sequence is used as an NR PRACH preamble. The short ZC sequence may cause lack of sequence in time resources defined as a CP and a RACH preamble. To solve this problem, a plurality of time and frequency resources may be allocated to a RACH resource in a RACH slot, and a gNB needs to signal the quantity of time resources used in the RACH slot in addition to frequency resource information to UEs.

5. Sequence Information

In LTE, 64 sequences are allocated to a RACH resource and, when a root code (i.e., root sequence) is allocated, the cyclic shift version of the root code is mapped to a preamble index first before other root codes are used due to the zero cross correlation characteristic.

The same characteristic may be reused for an NR-PRACH. Sequences having the zero cross correlation characteristic may be allocated first for an RCH preamble. Here, zero cross correlation is provided by a cyclic shift version and a defined orthogonal cover (if defined). When the root code is allocated, the orthogonal cover is allocated according to a predefined rule or configuration and a cyclic shift version having the root code and the orthogonal cover is mapped to the preamble index.

That is, a PRACH configuration signaled by a gNB to a UE may include the following parameters;

RACH resource allocation in the time/frequency domain:
  a preamble format (CP duration and the number of repetitions of a ZC sequence)
Sequence information: a root code index, an orthogonal code index (if defined) and a cyclic shift length 6. Linkage Between RACH Resource and SS Block Index RACH resource information needs to include an SS block index associated per RACH resource. To this end, an SS block index associated per RACH resource may be signaled. However, SS blocks are mapped to RACH resources using a predefined rule in order to reduce signaling overhead and the network needs to signal the rule. That is, SS blocks may be sequentially mapped to RACH resources in the time domain. Exactly, actually transmitted SS blocks are mapped to RACH resources.

A method of signaling a Tx beam direction of a base station and connection information about RACH resources in an initial access state will be described in detail below. The Tx beam direction of the base station refers to a beam direction of SS blocks as described above and, when a UE can observe/measure a specific RS other than SS blocks in the initial access state, may additionally refer to the RS. For example, the specific RS may be a CSI-RS.

In NR, a plurality of SS blocks may be formed and transmitted according to the number of beams of a base station. In addition, each SS block may have a unique index and a UE may detect a PSS/SSS and decode a PBCH to infer the index of an SS block to which the PSS/SSS/PBCH belong. System information transmitted by the base station includes RACH configuration information. The RACH configuration information may include a list of a plurality of RACH resources, information for identifying the RACH resources and information about connection between each RACH resource and an SS block.

As in the above description in which RACH resources are limited to time/frequency resources in which a UE can transmit PRACH preambles, RACH resources are also limited to time/frequency resources in the following description. A method of indicating a RACH position on the frequency axis as well as a RACH position on the time axis will also be described below. In the above description, a single RACH resource is linked to one or more SS blocks and RACH resources consecutive on the time axis are defined as a RACH resource set. A plurality of RACH resource sets consecutive on the frequency axis as well as the time axis is defined as a RACH resource block.

Figure 21:
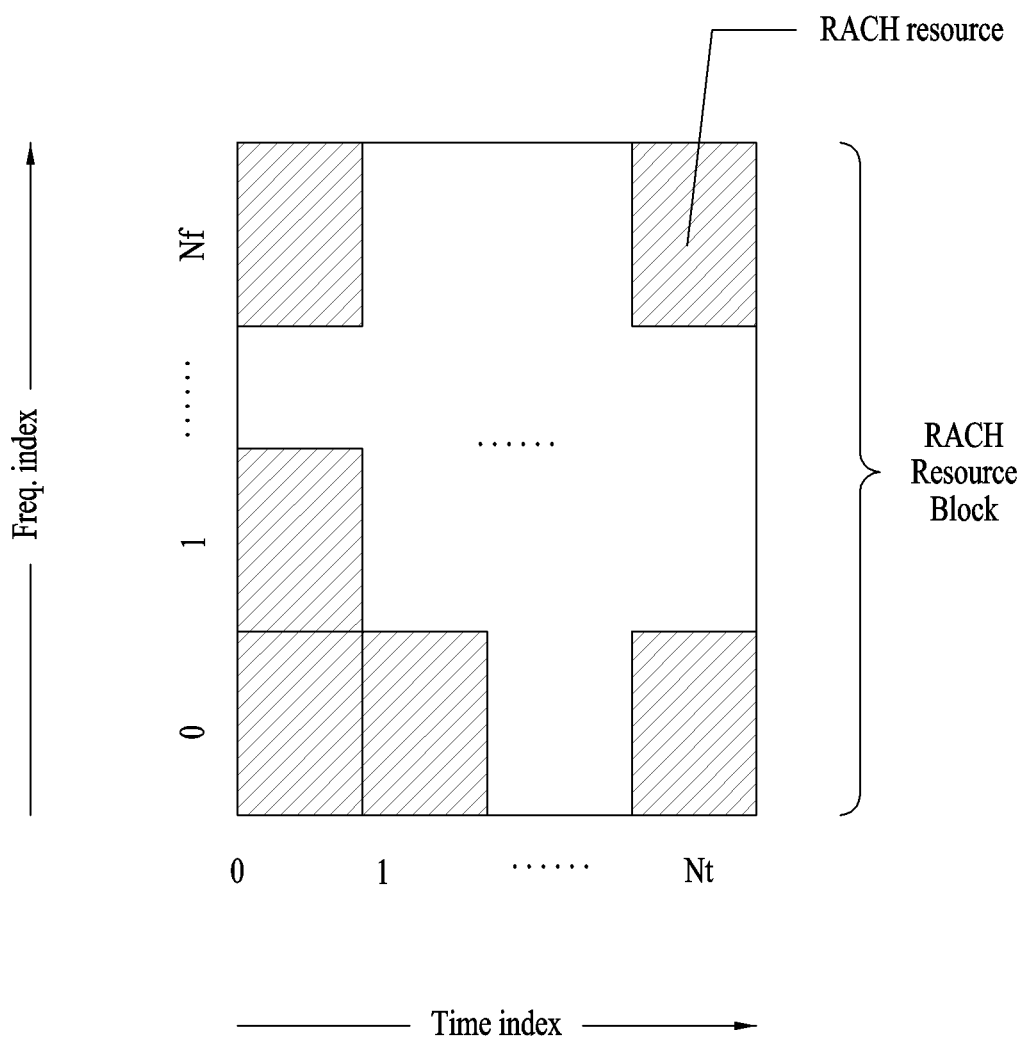

FIG. 21 illustrates a RACH resource block.

As illustrated in FIG. 21, the RACH resource block may be defined as a time/frequency chunk of RACH resources, and each RACH resource in the RACH resource block has a unique index determined by the time/frequency location.

A RACH resource index in the RACH resource block is mapped according to a specific rule. For example, the RACH resource index may be assigned in frequency-time order or time-frequency order. For example, referring to FIG. 21, RACH resources in the RACH resource block can be indexed as follows in the case of frequency-time order.

RACH Resource #0 (Time, Frequency): (0, 0)
RACH Resource #1: (1, 0)
RACH resource #2: (2, 0)
. . . . . . . . .

Here, the unit of the time-axis length in the RACH resource block may be determined by the RACH preamble format and the unit of the frequency-axis length may be determined by the RACH resource bandwidth (e.g., 1.08 MHz) or a resource block group (RBG) unit.

Meanwhile, when a UE requests system information transmission by transmitting a specific RACH preamble, a plurality of RACH resource blocks may be designated for the purpose of transmitting the number of SS blocks or system information in a system/cell. Particularly, when the number of SS blocks is large, uplink/downlink data services may be significantly restricted if RACH resources corresponding to each SS block are consecutively configured, as mentioned above, and thus the network may configure RACH resources consecutive on the time/frequency axis as a RACH resource block and discontinuously arrange configured RACH resource blocks. Accordingly, a plurality of RACH resource blocks may be configured and each RACH resource block may also have a unique index.

Figure 22:
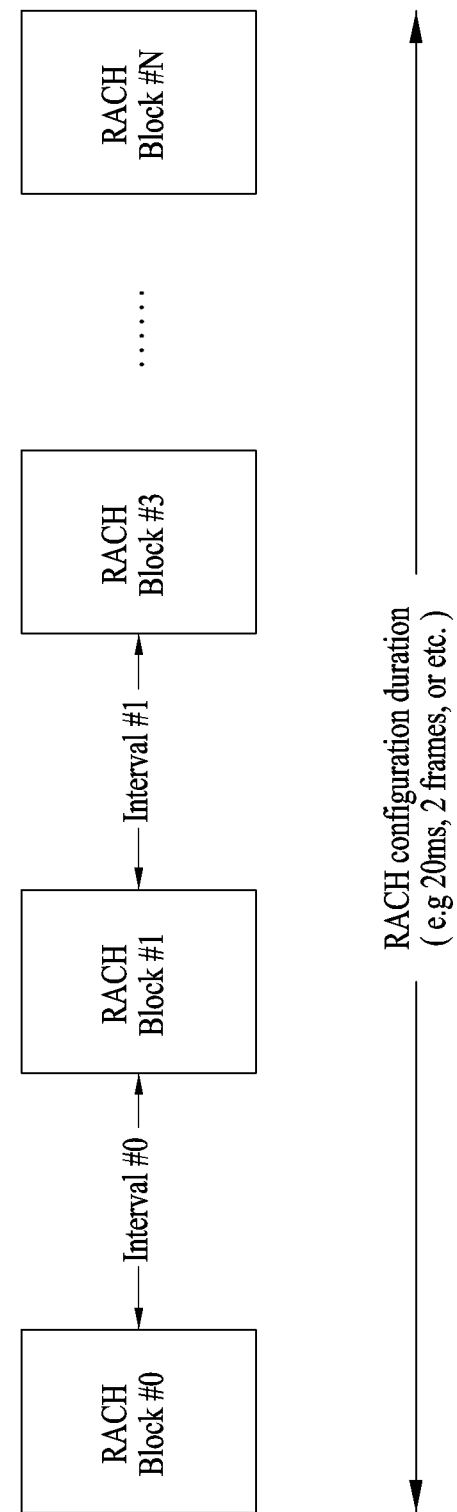

In other words, a duration (referred to as a RACH configuration duration hereinafter) in which a RACH resource block is configured may be designated in a system/cell, and one or more RACH blocks may be present in the RACH configuration duration. FIG. 22 illustrates a RACH configuration duration according to the present invention. Information that needs to be signaled by a network/gNB to UEs may include the length of a RACH configuration duration, the number of RACH resource blocks (i.e., RACH blocks) and the position of each RACH block. As illustrated in FIG. 22, UEs may be notified of an interval between RACH blocks in the RACH configuration duration. For example, the network/gNB may signal, as RACH block position information, a relative position such as the number of slots or offset information in the unit of absolute time from RACH block #0 or directly signal a RACH block start slot index in the RACH configuration period per RACH block.

Figure 23:
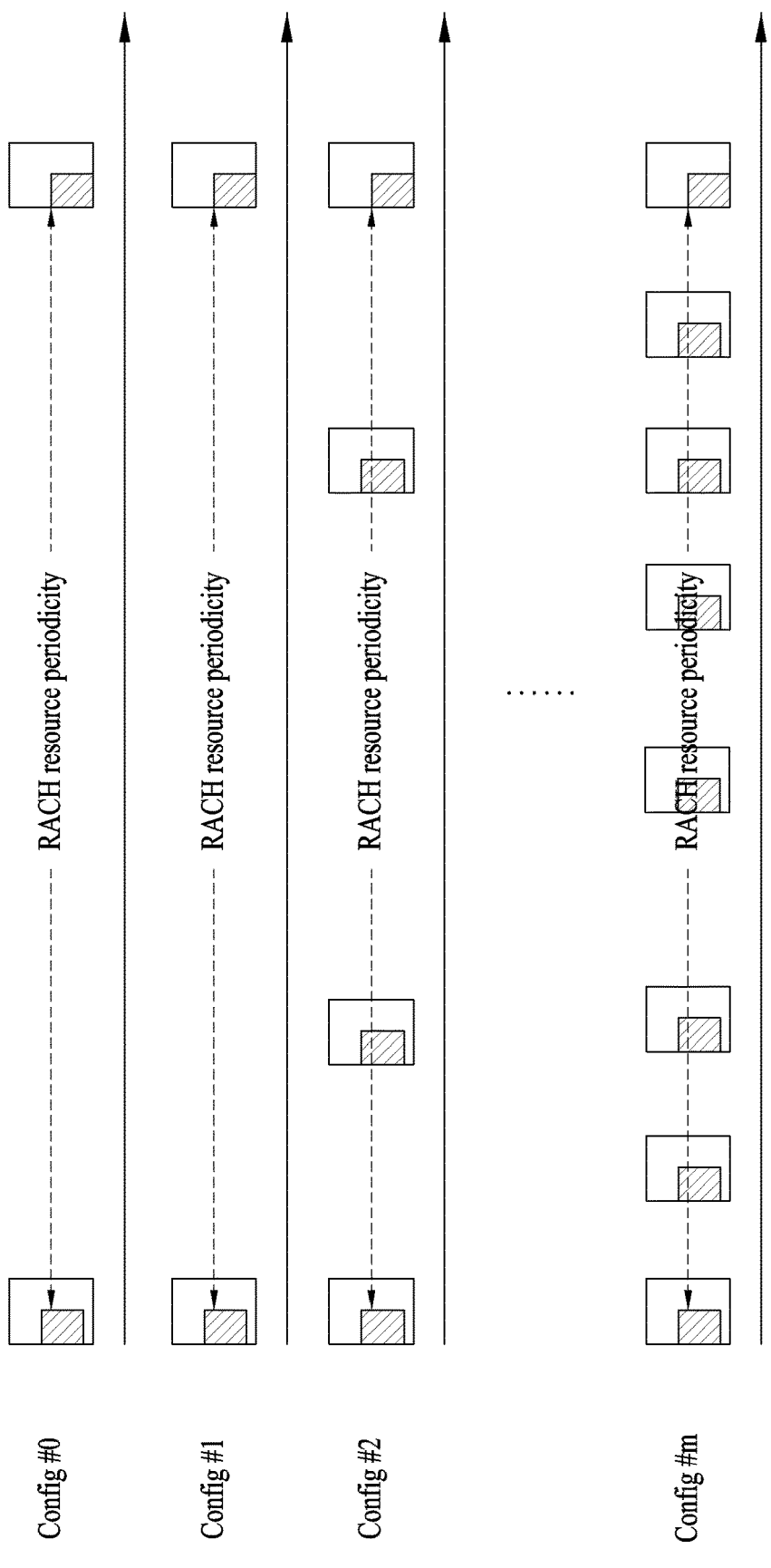

Each RACH resource in a RACH resource block may have a unique configuration. In this case, RACH resources may have different RACH resource generation frequencies and periodicities, and each RACH resource may be connected to a specific SS block, CSI-RS or downlink beam direction. When there is such a connection relation, information about the connection relation is provided to UEs. FIG. 22 illustrates a configuration per RACH resource in a RACH resource block. Slot indices which can be reserved for RACH resources in specific RACH resource periodicity may be defined in the standard document, and different configuration numbers may be allocated according to RACH resource generation frequency, as illustrated in FIG. 23. The network/gNB may inform UEs of a generation frequency/periodicity of a specific RACH resource by signaling a specific configuration number through system information.

The network may signal the number of RACH resource blocks (i.e., RACH blocks) and a start time (e.g., slot index) of each RACH resource block to UEs. In addition, the network signals the number Nt of RACH resources on the time axis and the number Nf o f RACH resources on the frequency axis when signaling information about each RACH resource block to UEs. Nt and Nf may be different for RACH resource blocks. The network/gNB maps RACH resource indices according to time/frequency locations of RACH resources in a RACH resource block and informs UEs of information (e.g., configuration number) indicating a periodicity/generation frequency of each RACH resource and information such as connected SS blocks or CSI-RS index. Here, the network/gNB may signal the periodicity/generation frequency of each RACH resource by indicating a specific configuration number set according to generation frequency of each RACH resource, as described above.

In addition, a RACH preamble format may be configured per RACH resource. Although all RACH preamble formats may be configured as the same format in the system, a subcarrier spacing and the number of repetition are fixed in a RACH resource block and different RACH preamble formats may be configured for RACH resource blocks in reality. However, although the number of repetitions of a RACH preamble is fixed in the same RACH resource block, RACH resources included in the RACH resource block may be configured to use different preamble sequences. For example, different root indices or cyclic shift (CS) versions may be configured for respective RACH resources in a RACH resource block.

With respect to signaling for RACH configuration, the network performs a process of identifying time/frequency resources for RACH preamble transmission, that is, RACH resources. To this end, a RACH resource index is determined by a RACH resource block index and a RACH resource index in a RACH resource block and RACH resource generation frequency/periodicity per RACH resource index may correspond to each of a plurality of RACH configuration numbers in the present invention. In addition, the network transmits RACH preamble information which can be used per RACH resource to UEs and transmits connected SS block index or CSI-RS index information. Accordingly, when a UE intends to perform RACH transmission in a specific downlink beam direction, the UE can acquire information about RACH time/frequency resources and preamble resources to be used and perform RACH transmission using the resources.

8. Some Lists of PRACH Configuration Content
(1) RACH preamble format: 4 bits
Preamble format for a long sequence having a length of 839: 4 states
Preamble format for a short sequence of 127 or 139: 11 states
(2) Ncs≥4 bits
(3) Subcarrier spacing of PRACH Msg. 1: 2 bits
B6: 15 kHz, 30 kHz, 1.25 kHz, 5 kHz
A6: 60 kHz, 120 kHz, [1.25 kHz, 5 kHz]
(4) PRACH Msg. 3 for subcarrier spacing:
B6: 15 kHz, 30 kHz, [60 kHz]
A6: 60 kHz, 120 kHz, [240 kHz]
Signaling through UL BWP can be performed
(5) RACH slot configuration information
RACH slot indication: X bits (a table which has M states according to RACH subcarrier spacing and thus can indicate M states with respect to RACH time resources is required)
RACH slot type information: 2 bits
(6) UL BWP: Y bits
(7) The number of RAPIDs (Np)
(8) The number or RACH resources in a RACH resource group (Nr)

Figure 24:
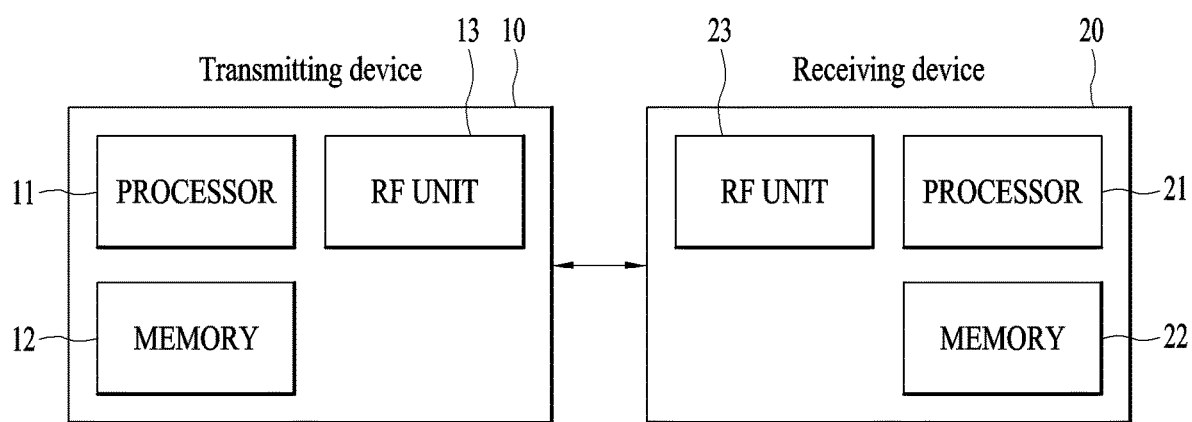
FIG. 24 is a block diagram illustrating components of a transmitter 10 and a receiver 20 which perform the present invention.

FIG. 24 is a block diagram illustrating elements of a transmitting device 10 and a receiving device 20 for implementing the present invention.

The transmitting device 10 and the receiving device 20 respectively include Radio Frequency (RF) units 13 and 23 capable of transmitting and receiving radio signals carrying information, data, signals, and/or messages, memories 12 and 22 for storing information related to communication in a wireless communication system, and processors 11 and 21 operationally connected to elements such as the RF units 13 and 23 and the memories 12 and 22 to control the elements and configured to control the memories 12 and 22 and/or the RF units 13 and 23 so that a corresponding device may perform at least one of the above-described embodiments of the present invention.

The memories 12 and 22 may store programs for processing and controlling the processors 11 and 21 and may temporarily store input/output information. The memories 12 and 22 may be used as buffers.

The processors 11 and 21 generally control the overall operation of various modules in the transmitting device and the receiving device. Especially, the processors 11 and 21 may perform various control functions to implement the present invention. The processors 11 and 21 may be referred to as controllers, microcontrollers, microprocessors, or microcomputers. The processors 11 and 21 may be implemented by hardware, firmware, software, or a combination thereof. In a hardware configuration, application specific integrated circuits (ASICs), digital signal processors (DSPs), digital signal processing devices (DSPDs), programmable logic devices (PLDs), or field programmable gate arrays (FPGAs) may be included in the processors 11 and 21. Meanwhile, if the present invention is implemented using firmware or software, the firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

The processor 11 of the transmitting device 10 performs predetermined coding and modulation for a signal and/or data scheduled to be transmitted to the outside by the processor 11 or a scheduler connected with the processor 11, and then transfers the coded and modulated data to the RF unit 13. For example, the processor 11 converts a data stream to be transmitted into K layers through demultiplexing, channel coding, scrambling, and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the RF unit 13 may include an oscillator. The RF unit 13 may include NS (where NS is a positive integer) transmit antennas.

A signal processing process of the receiving device 20 is the reverse of the signal processing process of the transmitting device 10. Under control of the processor 21, the RF unit 23 of the receiving device 20 receives radio signals transmitted by the transmitting device 10. The RF unit 23 may include Nr (where Nr is a positive integer) receive antennas and frequency down-converts each signal received through receive antennas into a baseband signal. The processor 21 decodes and demodulates the radio signals received through the receive antennas and restores data that the transmitting device 10 intended to transmit.

The RF units 13 and 23 include one or more antennas. An antenna performs a function for transmitting signals processed by the RF units 13 and 23 to the exterior or receiving radio signals from the exterior to transfer the radio signals to the RF units 13 and 23. The antenna may also be called an antenna port. Each antenna may correspond to one physical antenna or may be configured by a combination of more than one physical antenna element. The signal transmitted from each antenna cannot be further deconstructed by the receiving device 20. An RS transmitted through a corresponding antenna defines an antenna from the view point of the receiving device 20 and enables the receiving device 20 to derive channel estimation for the antenna, irrespective of whether the channel represents a single radio channel from one physical antenna or a composite channel from a plurality of physical antenna elements including the antenna. That is, an antenna is defined such that a channel carrying a symbol of the antenna can be obtained from a channel carrying another symbol of the same antenna. An RF unit supporting a MIMO function of transmitting and receiving data using a plurality of antennas may be connected to two or more antennas. In the present invention, the RF unit is also referred to as a transceiver.

In the present invention, the RF units 13 and 23 may support Rx BF and Tx BF. For example, in the present invention, the RF units 13 and 23 may be configured to perform the function illustrated in FIG. 3.

In the embodiments of the present invention, a UE operates as the transmitting device 10 in UL and as the receiving device 20 in DL. In the embodiments of the present invention, a gNB operates as the receiving device 20 in UL and as the transmitting device 10 in DL. Hereinafter, a processor, a transceiver, and a memory included in the UE will be referred to as a UE processor, a UE transceiver, and a UE memory, respectively, and a processor, a transceiver, and a memory included in the gNB will be referred to as a gNB processor, a gNB transceiver, and a gNB memory, respectively.

The gNB processor of the present invention may transmit PRACH configuration information including information about a RACH slot which may be used by a UE for RACH transmission and information indicating a subcarrier spacing for a PRACH to the UE and detect a RACH preamble transmitted in the RACH slot. Here, the RACH preamble is generated by the UE on the basis of the PRACH configuration information and subcarrier spacing transmitted by the gNB, and thus the length of the RACH slot may vary according to the subcarrier spacing indicated by the gNB processor. Further, the PRACH configuration information may include information such as a start symbol index, a RACH preamble format and a PRACH duration.

The UE processor of the present invention may receive PRACH configuration information including information about a RACH slot available for RACH transmission and information indicating a subcarrier spacing for a PRACH through a higher layer from the gNB and transmit the RACH preamble in the RACH slot on the basis of the PRACH configuration information and the subcarrier spacing transmitted by the gNB. Here, the length of the RACH slot may vary according to the subcarrier spacing indicated by the gNB processor. That is, the length of one slot increases as the subcarrier spacing decreases, and thus the length of a RACH slot included in a subframe also increases as the subcarrier spacing decreases. Accordingly, the number of slots included in a single frame decreases as the subcarrier spacing decreases.

In addition, a symbol index to which a RACH preamble is actually mapped in the RACH slot may be determined by RACH preamble format information and the sub carrier spacing. Here, information about the start symbol index may be equally applied to all RACH slots. For example, a symbol having index #0 or #2 may be equally applied as a start index in all RACH slots. Furthermore, the UE processors may repeatedly map the generated RACH preamble sequence according to periodicity corresponding to the PRACH configuration information, and a short sequence having a length of 139 may be used as the RACH preamble sequence.

As described above, the detailed description of the preferred embodiments of the present invention has been given to enable those skilled in the art to implement and practice the invention. Although the invention has been described with reference to exemplary embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

The invention claimed is:

1. A method of transmitting a physical random access channel (PRACH) signal by a user equipment (UE) in a wireless communication system, the method comprising:
   receiving, from a base station, configuration information for a PRACH resource in which to transmit the PRACH signal,
   wherein the configuration information relates to (i) a PRACH slot in which to transmit the PRACH signal, the PRACH slot comprising a plurality of Orthogonal Frequency Division Multiplexing (OFDM) symbols, and (ii) a starting OFDM symbol, among the plurality of OFDM symbols in the PRACH slot, for the PRACH resource in which to transmit the PRACH signal; and
   transmitting, to the base station, the PRACH signal starting from the starting OFDM symbol in the PRACH slot, based on the configuration information.

2. The method according to claim 1, wherein the configuration information relates to slot type information that indicates a symbol index for the starting OFDM symbol.

3. The method according to claim 2, wherein based on the slot type information indicating a slot type, the symbol index for the starting OFDM symbol is same in each of a plurality of PRACH slots.

4. The method according to claim 1, wherein the configuration information comprises a symbol index for the starting OFDM symbol.

5. The method according to claim 1, wherein the starting OFDM symbol has a symbol index of 0 or 2.

6. The method according to claim 1, further comprising:
   receiving, from the base station, information regarding a subcarrier spacing for the PRACH signal, wherein a length of the PRACH slot is related to the subcarrier spacing.

7. The method according to claim 6, wherein the configuration information comprises information regarding a frame that is related to a plurality of slots for the PRACH signal, and
   wherein a number of the plurality of slots related to the frame is proportional to the subcarrier spacing for the PRACH signal.

8. The method according to claim 7, wherein the plurality of slots for the PRACH signal are repeatedly mapped based on a periodicity that is configured by the configuration information.

9. The method according to claim 6, wherein the length of the PRACH slot is inversely proportional to the subcarrier spacing, based on a preamble sequence of the PRACH signal being a short sequence having a length of 139.

10. A user equipment (UE) configured to transmit a physical random access channel (PRACH) signal in a wireless communication system, the UE comprising:
   a transceiver;
   at least one processor; and
   at least one computer memory operably connectable to the at least one processor and storing instructions that, when executed by the at least one processor, perform operations comprising:
   receiving, from a base station through the transceiver, configuration information for a PRACH resource in which to transmit the PRACH signal, wherein the configuration information relates to (i) a PRACH slot in which to transmit the PRACH signal, the PRACH slot comprising a plurality of Orthogonal Frequency Division Multiplexing (OFDM) symbols, and (ii) a starting OFDM symbol, among the plurality of OFDM symbols in the PRACH slot, for the PRACH resource in which to transmit the PRACH signal; and
   transmitting, to the base station through the transceiver, the PRACH signal starting from the starting OFDM symbol in the PRACH slot, based on the configuration information.

11. The UE according to claim 10, wherein the configuration information relates to slot type information that indicates a symbol index for the starting OFDM symbol.

12. The UE according to claim 11, wherein based on the slot type information indicating a slot type, the symbol index for the starting OFDM symbol is same in each of a plurality of PRACH slots.

13. The UE according to claim 10, wherein the configuration information comprises a symbol index for the starting OFDM symbol.

14. The UE according to claim 10, wherein the starting OFDM symbol has a symbol index of 0 or 2.

15. The UE according to claim 10, wherein the operations further comprise:
   receiving, from the base station through the transceiver, information regarding a subcarrier spacing for the PRACH signal, wherein a length of the PRACH slot is related to the subcarrier spacing.

16. The UE according to claim 15, wherein the configuration information comprises information regarding a frame that is related to a plurality of slots for the PRACH signal, and wherein a number of the plurality of slots related to the frame is proportional to the subcarrier spacing for the PRACH signal.

17. The UE according to claim 16, wherein the plurality of slots for the PRACH signal are repeatedly mapped based on a periodicity that is configured by the configuration information.

18. The UE according to claim 15, wherein the length of the PRACH slot is inversely proportional to the subcarrier spacing, based on a preamble sequence of the PRACH signal being a short sequence having a length of 139.

19. A method of receiving a physical random access channel (PRACH) signal by a base station (BS) in a wireless communication system, the method comprising:
   transmitting, to a user equipment (UE), configuration information for a PRACH resource in which to transmit the PRACH signal, wherein the configuration information relates to (i) a PRACH slot in which to transmit the PRACH signal, the PRACH slot comprising a plurality of Orthogonal Frequency Division Multiplexing (OFDM) symbols, and (ii) a starting OFDM symbol, among the plurality of OFDM symbols in the PRACH slot, for the PRACH resource in which to transmit the PRACH signal; and
   receiving, from the UE, the PRACH signal starting from the starting OFDM symbol in the PRACH slot, based on the configuration information.

20. A base station (BS) configured to receive a physical random access channel (PRACH) signal in a wireless communication system, the BS comprising:
   a transceiver;
   at least one processor; and
   at least one computer memory operably connectable to the at least one processor and storing instructions that, when executed by the at least one processor, perform operations comprising:
   transmitting, to a user equipment (UE) through the transceiver, configuration information for a PRACH resource in which to transmit the PRACH signal, wherein the configuration information relates to (i) a PRACH slot in which to transmit the PRACH signal, the PRACH slot comprising a plurality of Orthogonal Frequency Division Multiplexing (OFDM) symbols, and (ii) a starting OFDM symbol, among the plurality of OFDM symbols in the PRACH slot, for the PRACH resource in which to transmit the PRACH signal; and
   receiving, from the UE through the transceiver, the PRACH signal starting from the starting OFDM symbol in the PRACH slot, based on the configuration information.

* * * * *